(12) United States Patent
Fitz et al.

(10) Patent No.: US 6,314,713 B1
(45) Date of Patent: Nov. 13, 2001

(54) METHOD AND SYSTEM FOR IDENTIFYING A FEATURE ON A LONGITUDINALLY ADVANCING MEMBER AND MARKING THE ADVANCING MEMBER BASED ON THE IDENTIFICATION

(75) Inventors: Jonathan G. Fitz, West Columbia; Stephen Richard McNeill, Columbia, both of SC (US)

(73) Assignee: Pirelli Cables & Systems, LLC, Lexington, SC (US)

( * ) Notice: Subject to any disclaimer, the term of this patent is extended or adjusted under 35 U.S.C. 154(b) by 0 days.

(21) Appl. No.: 09/271,099

(22) Filed: Mar. 18, 1999

(51) Int. Cl.⁷ ..................................................... G02B 6/44
(52) U.S. Cl. .................. 57/293; 57/34; 385/147
(58) Field of Search .......................... 57/314, 293, 204, 57/294, 34; 385/147, 105, 100

(56) References Cited

U.S. PATENT DOCUMENTS

| 4,496,214 | 1/1985 | Oestreich et al. | 350/96.23 |
|---|---|---|---|
| 4,746,190 | 5/1988 | Oestreich et al. | 350/96.23 |
| 4,828,352 | 5/1989 | Kraft | 350/96.23 |
| 5,703,983 | 12/1997 | Beasley, Jr. | 385/104 |
| 5,729,966 | 3/1998 | Grulick | 57/293 |
| 5,745,628 | 4/1998 | Benzel et al. | 385/104 |
| 5,809,194 | 9/1998 | Lovie | 385/104 |

FOREIGN PATENT DOCUMENTS 0884616   12/1998  (EP) .

Primary Examiner—Danny Worrell
(74) Attorney, Agent, or Firm—Norris, McLaughlin & Marcus, P.A.

(57) ABSTRACT

A characteristic feature on a generally longitudinal member is detected as the member is longitudinally advanced on a path extending from a first position to a second position. Based on the detection of the feature on the member and monitoring of the advance of the member on the path, indicia can be applied to a desired position on the member. The detected feature can be an S-Z reversal existing or created on a strand of S-Z stranded optical fiber buffer tubes included in an optical fiber cable which is undergoing cable manufacture along a cabling line. Intensity data values representative of an optical image sample of the strand with the S-Z reversal feature, where the image sample is obtained by an optical radiation detector coupled to the path, are processed for identifying the S-Z reversal feature on the strand. Monitoring the advance of the cable to the marker allows for marking of the strand, or jacketing which has been applied to the strand, at a desired position during advance of the cable on the path.

39 Claims, 13 Drawing Sheets

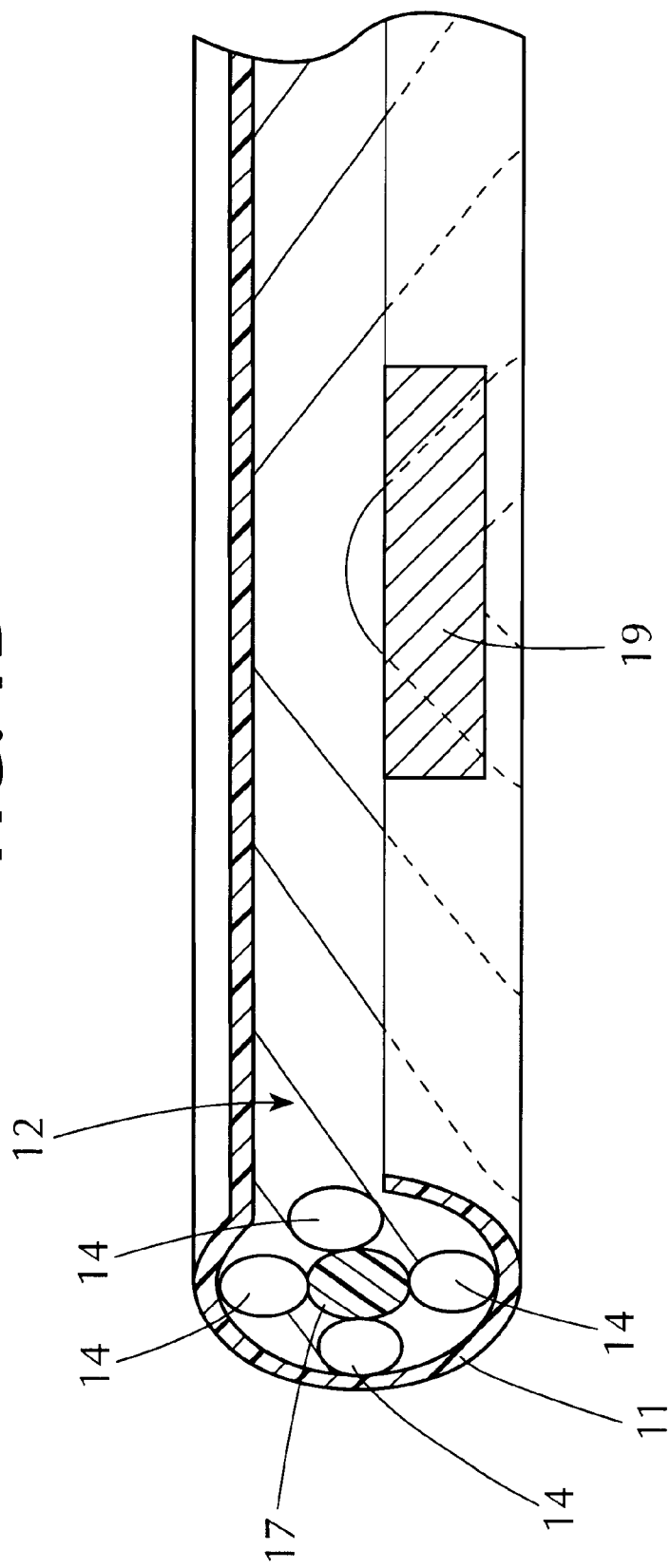

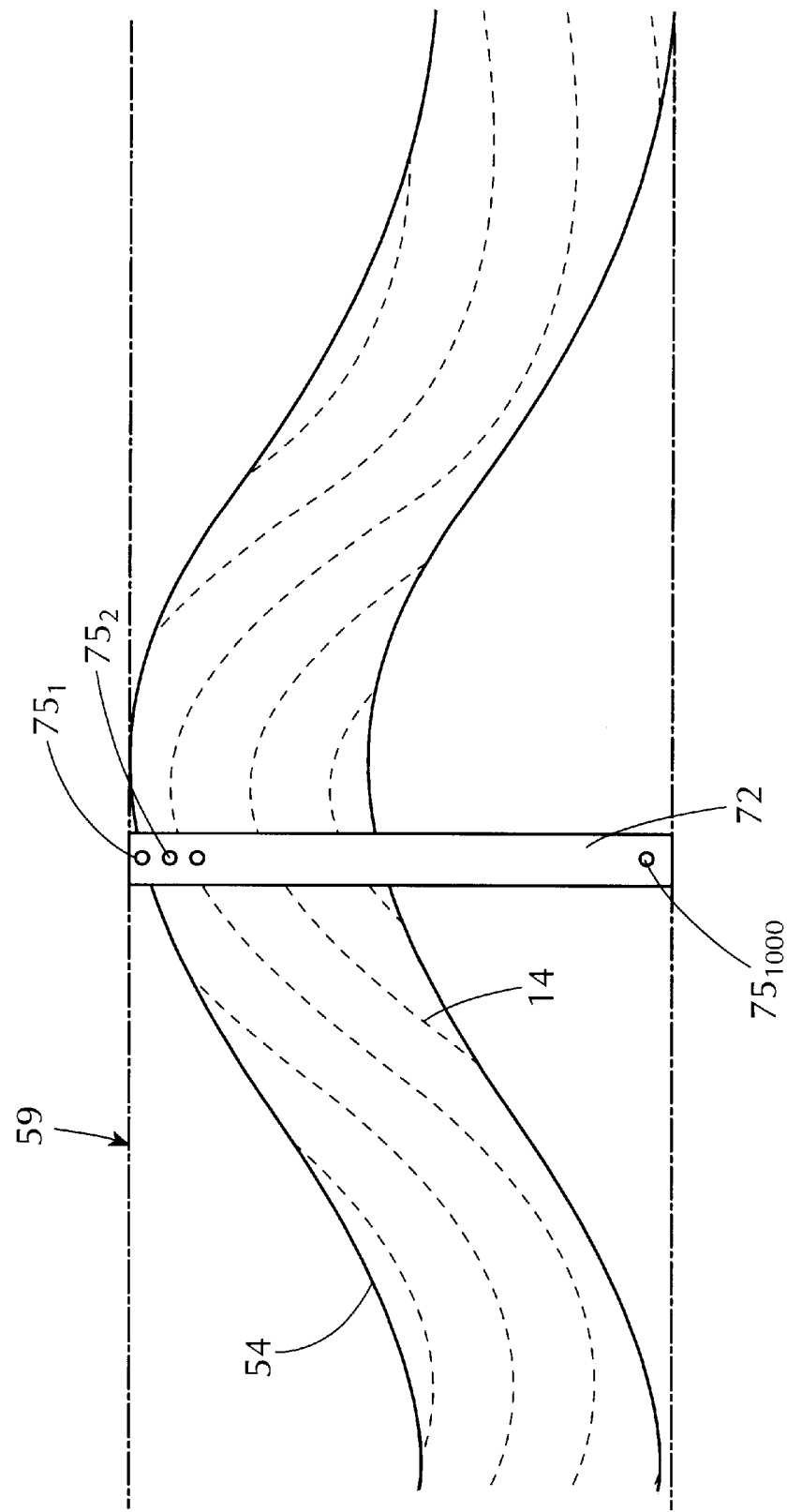

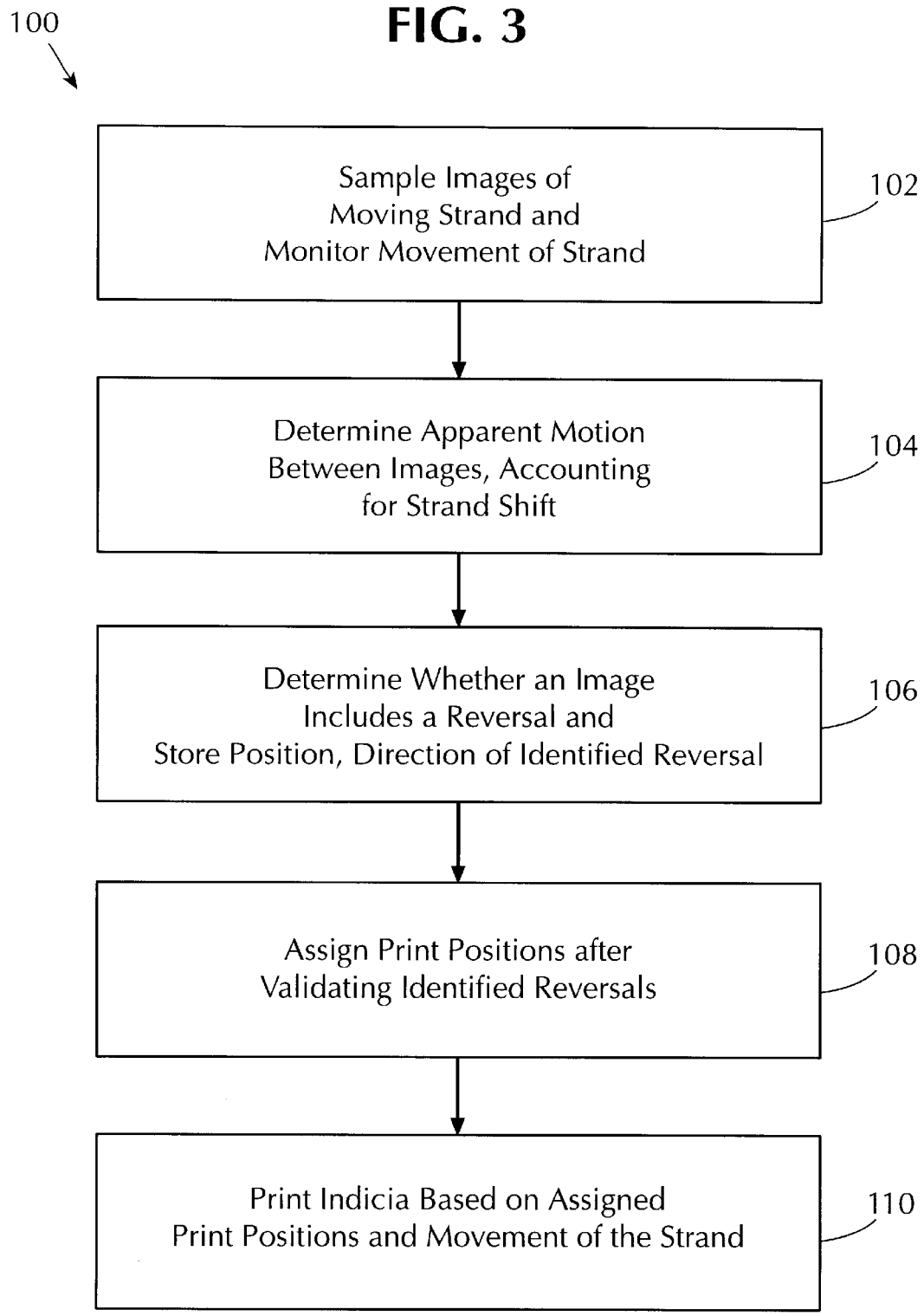

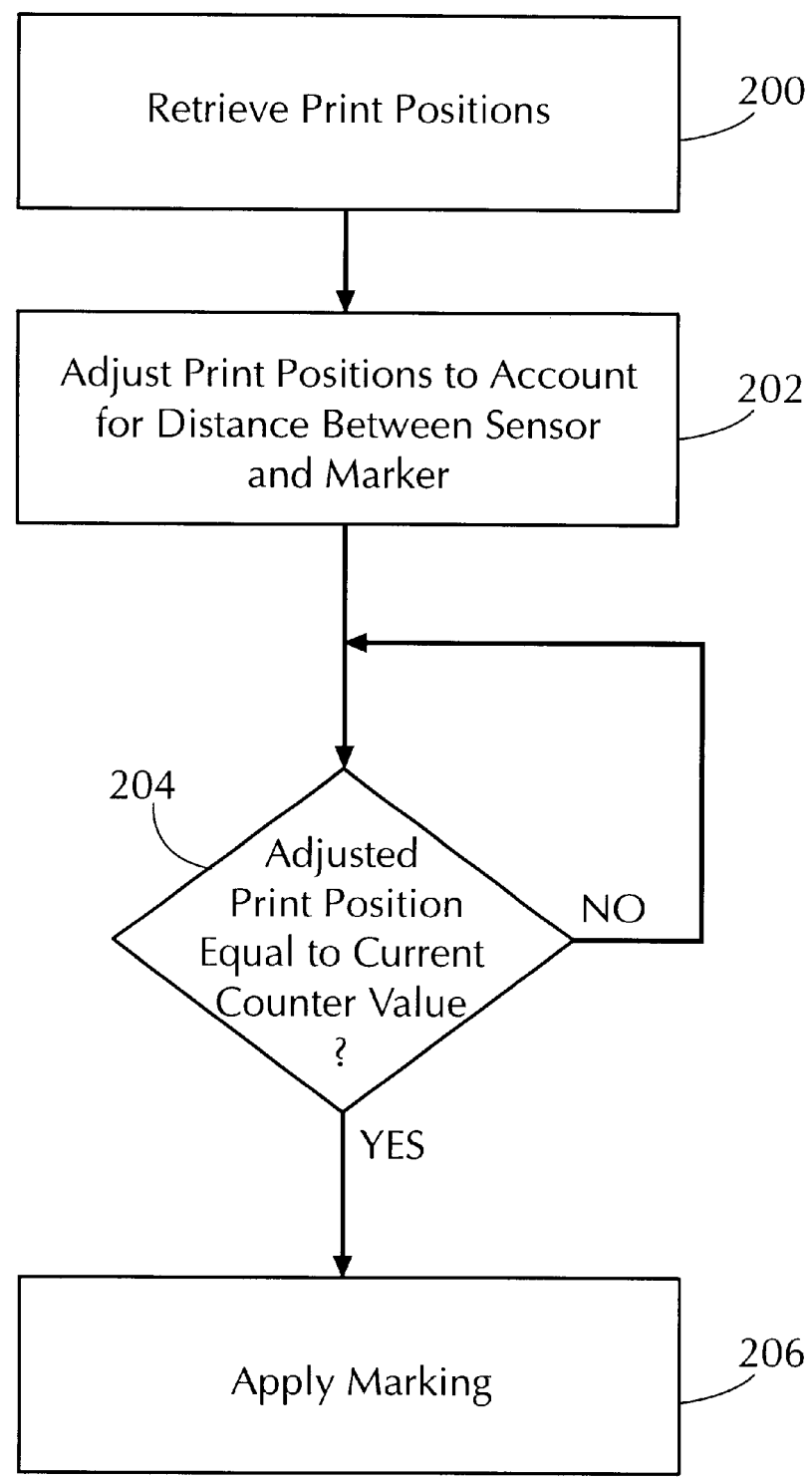

METHOD AND SYSTEM FOR IDENTIFYING A FEATURE ON A LONGITUDINALLY ADVANCING MEMBER AND MARKING THE ADVANCING MEMBER BASED ON THE IDENTIFICATION

FIELD OF THE INVENTION

The present invention relates to method and system for identifying a feature on a generally longitudinal member which is advanced longitudinally and then marking the advancing member based on the identification, and more particularly, for identifying S-Z reversals on an optical fiber cable including a strand of S-Z stranded buffer tubes during advance of the optical fiber cable on a cable manufacturing line and for marking either the strand or covering applied to the strand during manufacture of the cable, based on the identified reversals.

BACKGROUND

Optical fiber cables are currently used in telecommunication applications for transmitting optical signals from one location to another. Oftentimes, it is desired to tap or splice into an optical fiber cable at a point other than at an end of an optical fiber cable to obtain access to an optical fiber in the cable.

A large number of optical fiber cables currently in use and being manufactured have a core formed from buffer tubes, each of which encloses a plurality of optical fibers. The buffer tubes typically are stranded longitudinally along the length of a central strength member using the well known technique of S-Z or alternate-hand stranding. Although the core without a jacket can be used as a cable, the core usually is enclosed by a plastic jacketing or sheath which obscures the positions on the strand where the S-Z reversals occur. At the S-Z reversal positions of the S-Z strand, the buffer tube lengths are longer than the length of the overlying elements of the cable, e.g., the jacket, which makes slack available in the tubes and the fibers contained in the tubes. As is known, this slack eases the process of making connections to the fibers in the cable at the point where the cable is entered.

It is known that markings applied on the outer jacket of an optical fiber cable, which includes S-Z stranded buffer tubes, at positions corresponding to the S-Z reversals in the strand are advantageous because the markings identify on the outside of the cable the positions of the S-Z reversals within the cable. See, for example, U.S. Pat. Nos. 4,828,352, 4,746,190 and 4,496,214, incorporated by reference herein. These markings, in effect, identify the slack points or S-Z reversal positions and guide one desiring access to a fiber in the cable to a point along the cable where access is more easily obtainable.

The current art, however, does not describe how to identify accurately the position of an S-Z reversal in a strand of S-Z stranded buffer tubes during optical fiber cable manufacture and, accordingly, how to place a mark accurately on the strand of the cable at a position corresponding to an S-Z reversal of the strand contained within the cable, based on the identification of the S-Z reversals and as part of an integral and efficient cable manufacturing process performed along a conventional cabling line.

Therefore, there exists a need for a method and system for identifying the location of an S-Z reversal feature on a strand of S-Z stranded buffer tubes included in an optical fiber cable while the cable is advanced longitudinally along an optical fiber cable manufacturing line and for marking a covering, such as a jacket, applied to the strand at a position corresponding to the identified S-Z reversal, based on the identification of the S-Z reversal on the advancing cable.

SUMMARY OF THE INVENTION

In accordance with the present invention, a generally longitudinal member is advanced longitudinally on a path extending from a first position to a second position and a feature on the member is detected at a selected position on the path which is not the same as the second position. Based on the detection of the feature on the member and by monitoring the advance of the member on the path between the first position and the second position, indicia can be applied to a desired position on the member at a position on the path spaced from the selected position in the direction of the advance of the member.

In one aspect of the invention, the feature is created on the member while the member is advancing on the path and before the member reaches the second position. The feature and its position on the member is detected by monitoring the advance of the member between the first and second positions and based on knowledge of the location on the path where the feature is created on the member.

In a preferred embodiment, the member is an optical fiber cable including a strand of buffer tubes, each of which contains at least one optical fiber. The tubes are S-Z stranded together and around a central strength member by a stranding means at the first position. The feature to be identified is an S-Z reversal of the buffer tubes in the strand. A marker for applying indicia to the strand, or a covering encircling the strand, is at the second position. A means for monitoring advance of the cable is coupled to the path and monitors the advance of the cable from the stranding means to the marker. A microcontroller, which is coupled to the stranding means, the marker and the monitoring means, correlates the position on the strand where an S-Z reversal is created with the advance of the cable from the stranding means to the marker. The microcontroller transmits a trigger signal to the marker to cause the marker to apply indicia on the strand, or if present, a covering encircling the strand, at the position on the cable detected as having an S-Z reversal when the cable passes opposite the marker.

In another aspect of the invention, the feature is already present on the member before the member is advanced on the path and an optical light detector is utilized to detect the feature. The feature and its position on the member is detected by monitoring the advance of the member between the first and second positions and based on a knowledge of the location on the path where the feature on the advancing member is detected.

In an alternative preferred embodiment, the member is an optical fiber cable including a strand of S-Z stranded buffer tubes, each of which contains at least one optical fiber, and the feature is an S-Z reversal on the strand. An optical reflected light detector is at the first position and the marker is at the second position. A means for monitoring advance of the cable is coupled to the path and monitors advance of the cable on the path from the detector to the marker. A microcontroller is coupled to the optical reflected light detector, the marker and the monitoring means. The detector obtains optical image samples of the strand which are then converted into representative digital intensity data values. The microcontroller processes the intensity data to identify an image sample of the strand that includes an S-Z reversal and tracks the position of the identified S-Z reversal on the advancing cable based on data provided by the monitoring means. Further, the microcontroller transmits a trigger signal to the marker to cause the marker to apply indicia to a desired position on a jacketing layer which is applied to the strand as the cable advances from the detector to the marker. Preferably, the desired position on the jacketing layer corresponds to the position of an S-Z reversal of the underlying strand which the jacketing layer covers.

In one of the preferred embodiments, the optical reflected light detector includes a linear sensor which generates digital intensity data representative of linear optical image samples obtained of the strand. The microcontroller performs processing operations on the intensity data to identify S-Z reversals in the sampled images of the strand by first accounting for any shifting of the strand relative to the line of sensors between an image sample and the next consecutive image sample and then determining the apparent motion of the strand between the consecutive image samples. The microcontroller, based on the apparent motion determination for image samples consecutively preceding and succeeding a subject image sample, identifies whether the subject image sample includes an S-Z reversal. The microcontroller transmits a trigger signal to the marker to cause the marker to apply indicia to the strand or a jacket on the strand at the position on the strand or jacket corresponding to an image sample identified as having an S-Z reversal. The microcontroller transmits the trigger signal based on the position on the strand corresponding to the image sample having the identified reversal and data representative of the advance of the cable from the detector to the marker.

In a further embodiment, the microcontroller performs processing to validate the image samples identified as having an S-Z reversal. The validation processing includes initially fitting an S-Z stranding fit function to the position on the strand of a subject image sample identified as having an S-Z reversal and the positions of image samples on the strand consecutively preceding the subject image sample which also have been identified as having an S-Z reversal. The subject image sample and other image samples with an identified reversal succeeding the subject image sample are identified as validated based on an evaluation of variations between the expected positions of the S-Z reversals defined by the fit function and the corresponding positions on the strand of the subject image sample and the other reversal-identified image samples.

In a further embodiment, if the subject image sample or any of the other reversal-identified image samples is not validated, the microcontroller performs processing to attempt to determine a reversal position for the non-validated image sample. The microcontroller evaluates the variations between the positions of a predetermined number of image samples on the strand consecutively succeeding a non-validated image sample and which have also been identified as having an S-Z reversal with the expected positions defined from the fit function and computes a reversal position if the variations satisfy validation criteria. Alternatively, the microcontroller can compute a reversal position by extrapolation from preceding or subsequent reversal positions or by deviation from the fit function.

In still a further embodiment, the microcontroller performs processing to determine whether an image sample with an identified S-Z reversal which was not validated by the validation processing is associated with a perturbation in the S-Z stranding of the strand. If the determination is that a perturbation exists, the microcontroller adjusts the fit function to compensate for the perturbation and uses the adjusted fit function to perform validation processing on image samples which have an identified S-Z reversal and were detected subsequent to the non-validated image sample.

In another preferred embodiment, the optical light detector is a luminescent radiation detector and the strand of S-Z stranded buffer tubes, or a covering encircling the strand, includes luminescent markings on the outer periphery at positions corresponding to the S-Z reversals in the strand. The luminescent markings may have been applied to the strand or the covering in accordance with the present inventive technique. The luminescent detector obtains optical image samples of the strand or the covering and converts these image samples into representative intensity data values. The microcontroller processes the intensity data values to identify the presence of an S-Z reversal in an image sample by comparing the intensity data values for the image sample to a predetermined threshold value.

In another preferred embodiment, the microcontroller identifies the position of an S-Z reversal on an optical fiber cable including a strand of S-Z stranded optical fiber buffer tubes by evaluating the range of light contrast represented in the intensity data values for an optical image sample of the strand.

In other alternative embodiments, the optical reflected light detector includes a plurality of lines of sensors or is a full array camera.

In still another embodiment, the optical reflected light detector is a color camera and S-Z reversals on a strand of S-Z stranded buffer tubes are identified based on the presence of a single color in the representative intensity data for an image sample of the strand obtained by the color camera.

BRIEF DESCRIPTION OF THE DRAWINGS

Other objects and advantages of the present invention will be apparent from the following detailed description of the presently preferred embodiments, which description should be considered in conjunction with the accompanying drawings in which:

FIG. 1D is a partial cutaway view of the cable manufactured and marked by the system shown in FIG. 1A;

FIG. 2B is an illustration of one position of the strand opposite the camera along the cabling line of the system shown in FIG. 2A;

FIG. 3 is a generalized flow diagram of a method for identifying positions of S-Z reversals on a longitudinally advancing optical fiber cable including a strand of S-Z stranded buffer tubes by optical image detection and processing during manufacture of the optical fiber cable, and for marking jacketing which is applied to the strand during the cable manufacture based on the positions of the S-Z reversals identified;

FIG. 9 is a flow diagram of a method for marking jacketing applied to the strand of the advancing cable shown in FIG. 2A based on the print positions assigned in the method shown in FIG. 3.

DETAILED DESCRIPTION

As used herein, the expression "optical fiber cable" includes either stranded tubes without a covering layer, each tube with at least one optical fiber therein, or such tubes covered with one or more covering layers, such as a protective plastic jacket layer.

The invention is illustrated in connection with the identification of the positions of S-Z reversals on a longitudinally advancing optical fiber cable including a strand of S-Z stranded buffer tubes, each containing at least one optical fiber, by monitoring S-Z tube stranding operations or by optically detecting the presence of S-Z reversals on the strand, and the application of markings on the strand or a covering layer applied to the strand, during manufacture of the optical fiber cable on a cabling line, at positions corresponding to the S-Z reversals of the strand, based on the identification of the S-Z reversal positions. Although a marked strand is itself useful as an optical fiber cable, e.g., without a jacket as a covering layer, such a marked strand is also useful in connection with the embodiment described hereinafter in connection with FIG. 2A where the marking is applied to a jacket for the cable dependent on markings on the strand. It is to be understood, however, that the present inventive technique is applicable to the identification of a position on a longitudinally advancing, generally longitudinal member having a specific structural or characteristic feature by monitoring operations on the member that result in formation of the feature or by optically detecting the presence of the feature on the advancing member, and to the application of a marking on the advancing member at a desired position based on the identification of the position of the feature on the member.

Figure 1A:
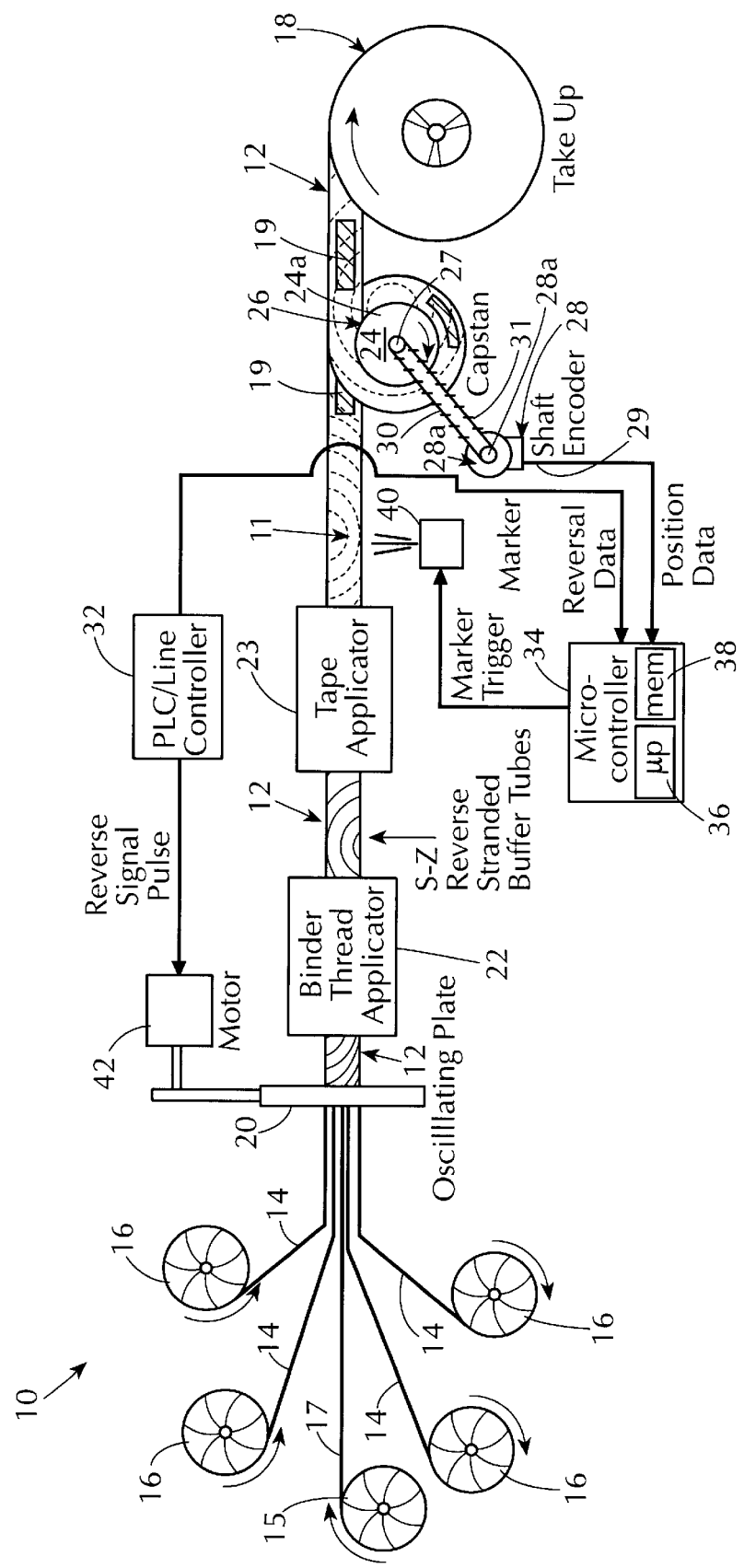
FIG. 1A shows an exemplary optical fiber cable marking system which can be operated, in accordance with the present invention, for identifying positions of S-Z reversals on an optical fiber cable, which includes S-Z stranded optical fiber buffer tubes and is advanced longitudinally on a cable manufacturing line, by monitoring the S-Z stranding of the individual tubes, and for marking the strand, or a covering that has been applied to the strand, based on the positions of the S-Z reversals identified.

FIG. 1A illustrates an exemplary S-Z buffer stranding and optical fiber cable marking system 10 in accordance with the present invention. The system 10 strands individual buffer tubes 14 using S-Z or alternate-hand stranding around a central strength member 17 to form a strand 12 and applies a tape layer 11 as a covering to the strand 12. The system 10 further provides for marking of the tape 11 that covers the strand 12 at positions corresponding to the underlying S-Z reversals of the tubes 14. If the marking is to be applied to the strand 12 rather than the tape 11, the tape 11 and the apparatus for applying the tape 11 can be omitted.

Referring to FIG. 1A, the system 10 includes four tube pay-off spools 16, each having a buffer tube 14 wound thereon. Each buffer tube 14 has at least one optical fiber therein. A typical buffer tube is from about 1 mm to about 6 mm in diameter. The system 10 further includes a strength member pay-off spool 15 having a strength member 17 wound thereon. The tubes 14 and the strength member 17, when stranded to form the strand 12, are connected to a take-up spool 18 and pass through an oscillating plate 20, a binder thread applicator 22 and a tape applicator 23.

The applicators 22 and 23 and a traction controlling device 24 are arranged consecutively between the plate 20 and the spool 18 along a path that the strand 12 traverses from the plate 20 to the spool 18. It is to be understood that the tape applicator 23 can be omitted from the system 10 if the strand 12 was to undergo cable manufacturing operations in the system shown in FIG. 2A in accordance with the present invention, as described in detail below.

The applicators 22 and 23 are conventional devices through which a strand of buffer tubes passes after stranding. The thread applicator 22 applies a thread (not shown) helically around the strand 12. The tape applicator 23 applies the tape 11 longitudinally around and surrounding the strand 12. The tape 11 can include a solid water blocking material, such as a water swellable element or layer which can, for example, be a known type of tape or a plurality of yarns both of which absorb moisture and swell. The tape 11 also protects the strand 12 from abrasion, retains the tubes 14 in their stranded positions and provides a surface to which molten plastic can adhere for forming a plastic jacket covering.

In a further embodiment, another thread is applied longitudinally around the tape 11 to hold the tape 11.

The traction controlling device, or capstan 24, includes a drum 24a with an outer drum surface 26 and an inner toothed sprocket 27 for causing rotation of the drum 24a. See U.S. Pat. No. 4,212,097, incorporated by reference herein.

Figure 1B:
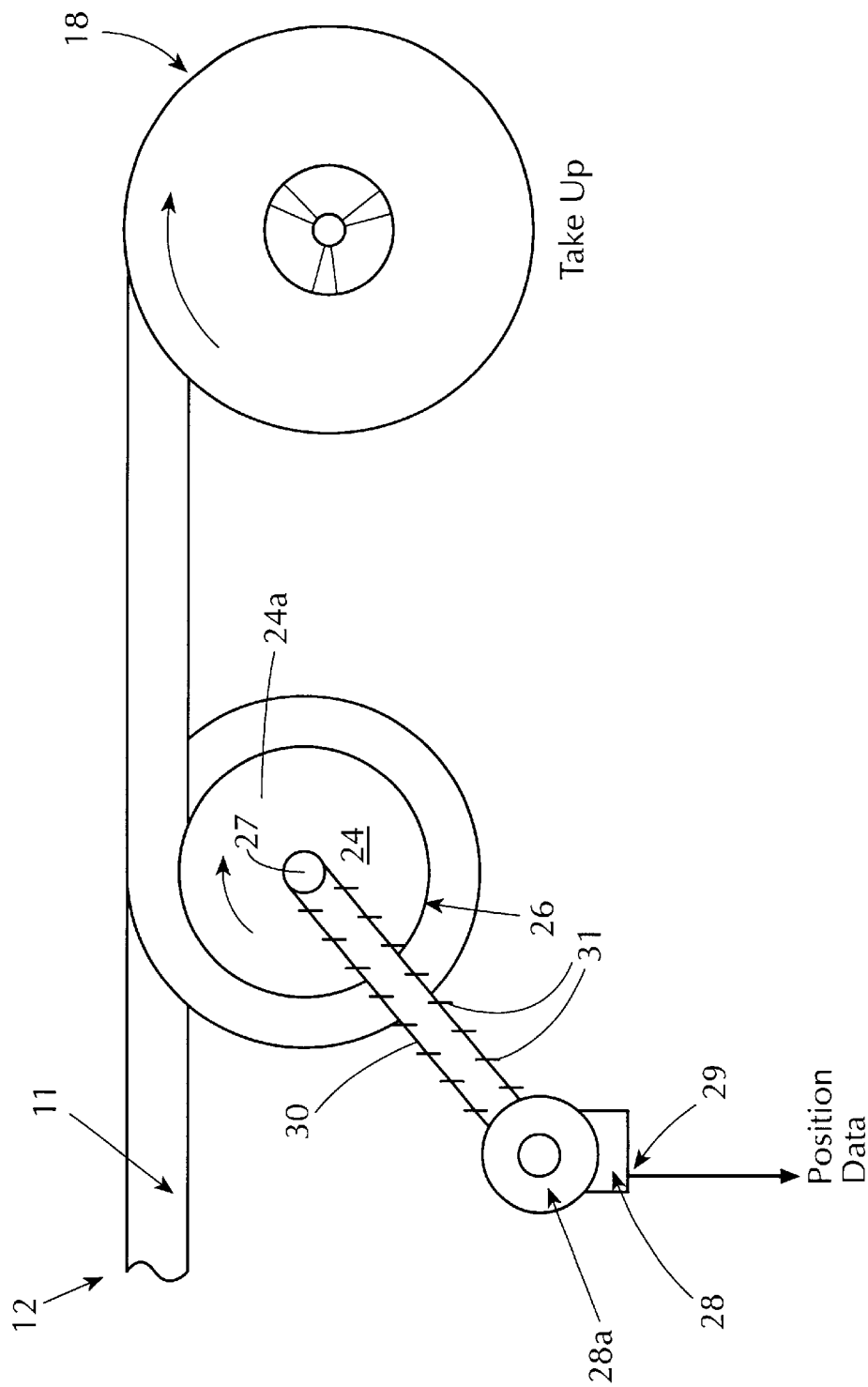
FIG. 1B shows an enlarged view of the traction controlling device in the system shown in FIG. 1A.

FIG. 1B shows an enlarged view of the capstan 24 in the system 10. Referring to FIG. 1B, the capstan 24 receives the strand 12, which is surrounded by the tape 11, and then wraps the covered strand 12 circumferentially around the surface 26 of the drum 24a before advancing the covered stand 12 to the spool 18.

Referring to FIGS. 1A and 1B, a shaft encoder 28 is coupled to the sprocket 27 of the capstan 24 by a conventional driving belt 30. The belt 30 includes teeth 31 on its inner surface which engage the teeth of the sprocket 27 so that the belt 30 is driven by the sprocket 27. The teeth 31 of the belt 30 also engage a toothed sprocket (not shown) on a drive shaft 28a of the encoder 28 to cause the shaft 28a to rotate with the drum 24a. Of course, another type of drive can be substituted for the belt drive, e.g., a gear drive or a direct coupling of the shaft 28 with the shaft of the drum 24a. The shaft encoder 28 includes a pulse output port 29 which is connected to a microcontroller 34 over signal lines.

Referring again to FIG. 1A, a PLC/Line controller 32 is connected to a motor 42, which drives the plate 20, and also to the microcontroller 34 by signal lines. The microcontroller 34 includes a processor 36 which is connected to a memory 38, such as a RAM. The microcontroller 34 is also coupled over signal lines to a marker 40. The marker 40 is positioned adjacent and at one side of the strand path and between the applicator 23 and the capstan 24.

The oscillating plate 20, the motor 42 and the controller 32 are conventional devices which are used in combination to strand individual buffer tubes and form a strand of S-Z stranded buffer tubes. In the system 10, the tubes 14 and the strength member 17 are threaded through the plate 20. The motor 42 rotates the oscillating plate 20 in a first direction, e.g., clockwise, to cause helical stranding, in one direction, of the buffer tubes 14 supplied from the spools 16 around the strength member 17. The controller 32 transmits reversal signals to the motor 42 that cause the motor 42 to reverse the direction that the motor 42 is rotating the plate 20. For example, if the motor 42 is rotating the plate 20 in the clockwise direction and then receives a reversal signal, the motor 42 reverses the direction that the plate 20 is rotated so that the plate 20 now turns in a second or opposite direction, e.g., counterclockwise. Consequently, the tubes 14 are stranded in the counterclockwise direction around the strength member 17. The position on the strand 12 where the direction of the tube stranding reverses is known as an S-Z reversal. In typical stranding operations, the controller 32 periodically transmits a reversal signal to the motor 42, which results in manufacture of the strand 12 with S-Z or alternate-hand stranded tubes 14. The spacing between reversals on the strand 12 usually is from about 16 to about 40 inches.

The applicator 22 receives the strand 12 from the plate 20 and helically wraps one or more threads (not shown) around the strand 12 for holding the tubes 14 in their S-Z stranded positions around the central strength member 17. The applicator 22 then routes the strand 12 to the tape applicator 23.

The tape applicator 23 longitudinally applies the binder tape 11 to the strand 12. The tape 11 constitutes a first covering on the strand 12.

From the applicator 23, the strand 12 with the tape 11 covering is supplied to the drum surface 26 of the capstan 24. The capstan 24 drives the strand 12 over the drum surface 26 in the direction of the take-up spool 18, preferably at a constant linear rate, to facilitate wrapping of the strand 12 around the take-up spool 18 and also advance of the strand 12 along the strand path in the system 10. See U.S. Pat. No. 4,212,097, incorporated by reference herein.

The belt 30 drives the shaft 28a at the encoder 28 which generates encoder pulses. The encoder 28 generates an encoder pulse when a predetermined length of the strand 12, which has been supplied to the capstan 24, is pulled along the path and toward the spool 18. Thus, the encoder pulses generated at the encoder 28 track the advance of the strand 12 along the strand path and through the system 10.

Figure 1C:
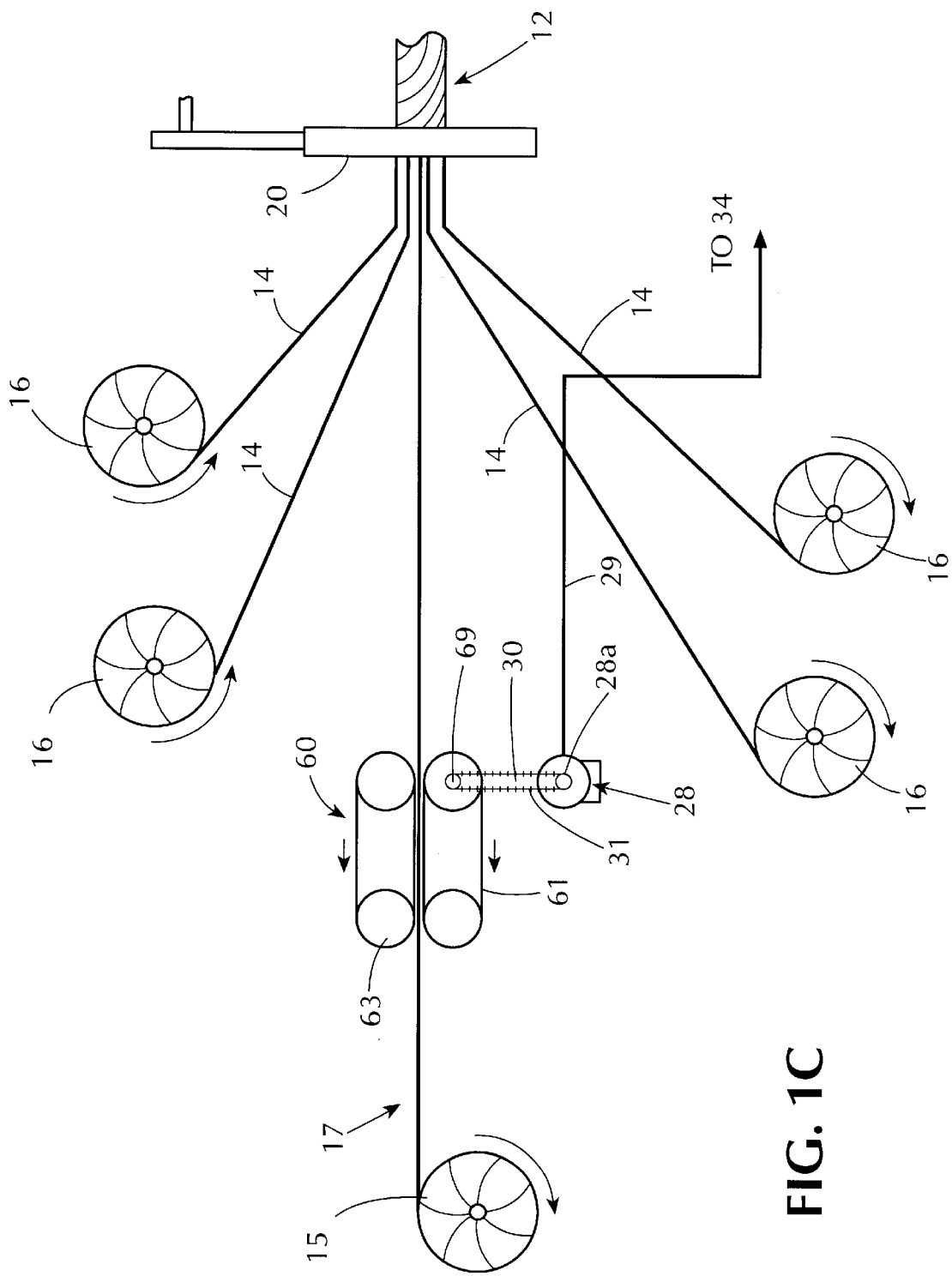
FIG. 1C shows an alternative embodiment of the system shown in FIG. 1A including a pressure and pulling device for receiving the strength member and which is coupled to the encoder.

In an alternative embodiment of the system 10 shown in FIG. 1C, the system 10 includes a pressure and pulling device or caterpuller 60. The caterpuller 60 is coupled to the strength member 17 at a position along its path of advance which is between the plate 20 and the reel 15. The caterpuller 60 is a conventional device including elastic belts 61 which extend and rotate around drive elements or wheels 63. See U.S. Pat. No. 3,769,697, incorporated by reference herein. The wheels 63 oppose each other and are spaced apart to receive, resiliently hold and drive the member 17 from the spool 15 to the take-up spool 18.

Referring to FIG. 1C, the shaft encoder 28 of the system 10, instead of being coupled to the capstan 24, is coupled to the caterpuller 60 by the belt 30. The teeth 31 of the belt 30 engage a toothed sprocket 69 which is attached at the center of one of the wheels 63 of the caterpuller 60. Therefore, the belt 30 is driven by the sprocket 69 when the wheels 63 rotate. The teeth 31 of the belt 30 also engage a toothed sprocket on the drive shaft 28a on the encoder 28 to cause the shaft 28a to rotate with the wheels 63. The belt 30, thus, moves in direct relation to the rotation of the wheels 63 to provide that the encoder 28 monitors the advance of the strand 12 towards the spool 18. The encoder 28, therefore, generates encoder pulses as the strength member 17 advances towards the spool 18. The rigidity and the low thermal coefficients of expansion and contraction of the strength member 17 provide that the advance of the strand 12 in the system 10 can be monitored with high precision by monitoring of the movement of the strength member 17 through the caterpuller 60.

The encoder 28, in either of the above-described embodiments, transmits the encoder pulses to the microcontroller 34. The controller 32 periodically transmits reverse signals to the motor 42 to create an S-Z reversal on the strand 12, as explained above. Further, the controller 32 simultaneously transmits to the microcontroller 34 data signals representative of the reverse signals supplied to the motor 42.

The memory 38 of the microcontroller 34 includes software executable by the processor 36 for processing the encoder pulses transmitted by the encoder 28 and the reverse data signals transmitted by the controller 32. This processing includes tracking the advance of the strand 12 and correlating particular events or data, such as encoder pulses indicating the position of the strand 12 along the path in the system 10 and S-Z reversals created on the strand 12. The tracking software can be of the type sold by SR McNeill Service of Columbia, S.C.

The marker 40 is a conventional device, such as the type sold by Dell Marking Systems of Ferndale, Michigan, which responds to an electronic trigger signal and directs indicia, such as, preferably, luminescent ink or paint, from a suitable applicator in a specific direction. In the system 10, when the marker 40 receives a trigger signal supplied by the microcontroller 34, the marker 40 applies paint or ink to a position on the tape 11 of the advancing strand 12 having an underlying S-Z reversal to form a marking 19. If the tape 11 is omitted, the marker 40 applies paint, which can be luminescent, or ink to the strand 12.

FIG. 1D shows a length of optical fiber cable which has been manufactured by operation of the system 10 and where a longitudinal portion of the tape 11 has been removed from the strand 12.

In one embodiment of the present invention, the processor 36 increments a counter location, Cnt, in the memory 38 by one each time that the microcontroller 34 receives an encoder pulse. The processor 36 stores the value of Cnt in location $RS_i$ in the memory 38 at the time that the microcontroller 34 receives a reverse data signal from the line controller 32, where i designates a specific reversal signal provided to the motor 42. The processor 36 increments the value of i by one each time a reversal data signal is received from the line controller 32. Cnt and i are initialized to zero in the memory 38 and the processor 36 does not begin incrementing Cnt and i and storing values in $RS_i$ until the tubes 14 are initially operated on at the plate 20. Further, location ADJ in the memory 38 is set equal to the number of encoder pulses that the encoder 28 would generate for movement of a position on the strand 12 from the plate 20 to the marker 40.

By maintaining a continuous count of the encoder pulses received at the microcontroller 34 and associating the value of the encoder pulse count with the reception of reversal signal data from the line controller 32, the processor 36 identifies positions on the strand 12 having an S-Z reversal.

In addition, after Cnt has been incremented at least ADJ-1 times, the processor 36 compares the value of Cnt to the sum of ADJ and the value of $RS_e$ for each encoder pulse received where e is equal to the value of i which corresponds to the reversal signal that the line controller 32 generated earliest and for which representative data is still stored in the memory 38. If the sum is equal to the current value of Cnt, the processor 36 transmits a trigger signal to the marker 40 and deletes the record of that eth reversal signal $RS_e$ from the memory 38.

In a preferred embodiment, the value stored in location ADJ is suitably adjusted to compensate for any delay in the response of the marker 40 after it receives a trigger signal and ensure that the marker 40 applies a marking at the reversal point. Significant delays in marking by the marker 40 in response to the trigger signal may occur if the marker 40 includes mechanical elements.

Thus, the system 10 operates to identify the positions of S-Z reversals on the advancing strand 12. The system 10 further applies indicia on the tape 11, or if the tape 11 is omitted, on the advancing strand 12, at the identified positions of the S-Z reversals at a position in the strand path succeeding the position that the tubes 14 are stranded and preceding the take-up spool 18. The markings corresponding to the underlying S-Z reversals on the strand 12 provide one means for facilitating marking of jacketing which is subsequently applied to the strand 12 during cable manufacture, as explained below in connection with FIGS. 2A, 2B and 3–8.

Figure 2A:
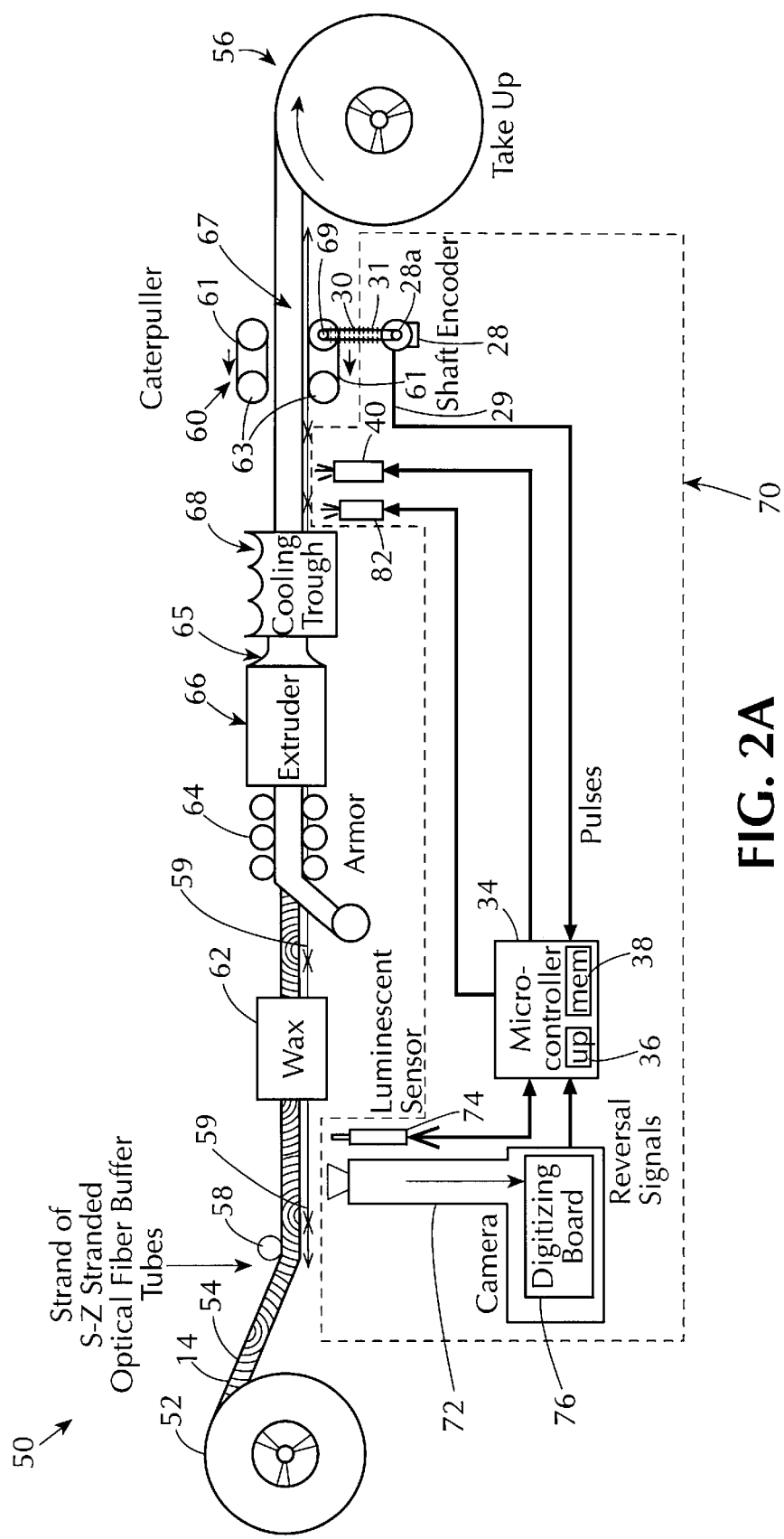
FIG. 2A shows an exemplary optical fiber cable manufacturing system which includes an optical image detection and cable marking system which can be operated, in accordance with the present invention, for identifying positions of S-Z reversals on a longitudinally advancing optical fiber cable which includes S-Z stranded optical fiber buffer tubes during manufacture of the optical fiber cable, and for marking jacketing which is applied to the strand during the cable manufacture at positions corresponding to the positions of the S-Z reversals identified.

FIG. 2A illustrates an exemplary optical fiber cable manufacturing system 50 and an optical image detection and processing and optical fiber cable jacket marking system 70. The system 70 is delineated by dotted lines. Like reference numerals are used to refer to elements having similar, and preferably identical, structural and functional characteristics as those described above in connection with the system 10.

Referring to FIG. 2A, the system 50 includes a supply spool 52. A strand 54 of optical fiber buffer tubes 14 which are S-Z stranded around a central strength member 17 is wrapped upon the spool 52. For purposes of illustrating one preferred embodiment of the invention, the strand 54 does not include any markings at the S-Z reversals. The system 50 defines a strand path or cabling line 59 over which the strand 54 travels. The line 59 extends between a strand guide 58 and a take-up spool 56. The strand 54 is held taut between the spool 56 and the supply spool 52. A wax applicator 62, an armor applicator 64, an extruder 66 and a cooling trough 68 are arranged consecutively along the line 59 subsequent to the guide 58.

The wax applicator 62 is a conventional device which applies wax material, such as is known in the art, to a strand of buffer tubes as part of optical cable manufacture.

In an alternative embodiment, a tape applicator 23 is used in combination with the wax applicator 62 in the system 50 to apply a tape to the strand. In still another alternative embodiment, a tape applicator 23 is used in place of the wax applicator 62 in the system 50.

The armor applicator 64 is a conventional device which applies armor to a strand of buffer tubes and is typically positioned along a cabling line subsequent to the position where the strand is coated with wax.

The extruder 66 is a conventional device which applies or extrudes hot plastic, such as thermoplastic resin, polyethylene or polyvinylchloride, over a strand, which can have one or more covering layers, to form the external plastic sheath or jacketing which encloses the strand.

The cooling trough 68 is a conventional device through which a strand of buffer tubes passes subsequent to extrusion of hot plastic thereover. Cooling of the hot plastic at the trough 68 expedites formation of jacketing on the strand with a solidified external covering on the strand.

A caterpuller 60 is positioned along the line 59 preceding the spool 56 and after the trough 68. The wheels 63 of the caterpuller 60 are spaced apart to receive, resiliently hold and drive a member, which has a width slightly larger than that of an optical fiber cable, from the trough 68 to the take-up spool 56.

In operation, the components of the system 50, excluding those of the system 70, provide for the manufacture of an optical fiber cable 67, which includes the strand 54, in a conventional manner. The spool 52 supplies the strand 54 and the guide 58 guides the strand 54 to the line 59. The applicators 62 and 64 apply wax and then an armor coating, respectively, to the strand 54 as the strand 54 advances along the line 59. After the armor coating is applied, the strand 54 advances to the extruder 66 and the extruder 66 extrudes hot plastic over the strand 54. The strand 54 is then supplied to the trough 68 to cool the hot plastic into a hardened sheath 65. The sheath 65 encloses the strand 54 and constitutes a first jacketing on the optical fiber cable 67. From the trough 68, the cable 67 is supplied between the belts 61 on the wheels 63 of the caterpuller 60. The caterpuller 60 drives the cable 67 toward the take-up spool 56 for take-up, thereby advancing the strand 54 along the line 59. These cable manufacturing operations are well known in the art and, by themselves, are not a part of the present invention.

In accordance with the present invention, the system 70 includes components which are arranged in association with the components of the system 50 and which operate as described in detail below in connection with FIGS. 2A, 2B and 3–9. In the illustrated embodiment, the system 70 identifies positions of S-Z reversals on the strand 54 of the cable 67 during manufacture of the cable 67 by optical image detection and processing, and marks the sheath 65 of the cable 67 at positions corresponding to the S-Z reversals, based on the identification of the S-Z reversals, before the cable 67 is supplied to the spool 56.

Referring to FIG. 2A, the system 70 includes an optical reflected light detector or camera 72, a marker 40 and a shaft encoder 28, all of which are connected by signal lines to a microcontroller 34. The camera 72 is positioned along the cabling line 59 preceding the armor applicator 64 and, preferably, between the applicator 62 and the guide 58. The marker 40 is positioned along the cabling line 59 subsequent to the cooling trough 68 and, preferably, preceding the caterpuller 60.

The shaft encoder 28 is coupled to the caterpuller 60 as described above for the system 10. The belt 30 moves in direct relation to the rotation of the wheels 63 to provide that the encoder 28 monitors the advance of the cable 67 along the line 59. The encoder 28 generates encoder pulses as the cable 67 advances along the line 59 and supplies the encoder pulses to the microcontroller 34. In normal operation of the system 50, the cable 67 advances along the line 59 at a substantially constant rate so that the encoder pulses are periodically supplied to and received at the microcontroller 34.

For purposes of illustration, the camera 72 is a conventional linear optical sensor having a single line of, for example, 1000 optical radiation sensors or pixels $75_1$, $75_2$, ... $75_{1000}$, extending across the strand path 59, as shown in FIG. 2B. Preferably, the number of pixels is equal to approximately twice the number of pixels required for detecting radiation across the entire width of the strand 54. The camera 72 is preferably similar in structure and operation to the CCD Linescan Camera sold by EG&G Reticon of Salem, Mass.

Referring to FIG. 2B, the pixels of the camera 72 are arranged perpendicular to the direction or path that the cable 67 advances along the line 59. The pixels receive optical radiation that is reflected from the strand 54 at the portion of the strand 54 which directly opposes and is perpendicular to the line of pixels. It is assumed that the portion of the cabling line 59 opposite and perpendicular to the camera 72 has a darkened or black surface having poor or no reflective qualities, such that only optical reflections from the strand 54 are received at the pixels.

The pixels of the camera 72 are placed at a predetermined distance from the line 59 to provide that an optical image of the strand 54, derived from optical reflections from the strand 54, is focused on the pixels as the cable 67 moves along the line 59. Typically, an optical image of a portion of the strand 54 has normal variations in intensity which correspond to light and dark areas. The light or bright spots in the image correspond to reflections from the top surface of an individual buffer tube in the strand 54. The darker areas represent the areas between the tubes 14. In addition, the image includes areas which are essentially without light reflection or black and correspond to the portions of the line 59 which are not covered by the strand 54 and are opposing and perpendicular to the line of pixels.

In operation, each pixel of the camera 72 is stimulated based on the intensity of light reflected from the portion of the line 59 on which the pixel is focused. Each pixel generates an electrical output signal which is proportional to the intensity of light energy being received at the pixel.

The camera 72 further includes a digitizing board means 76 comprising internal processing components, such as a processor and analog-to-digital converters (not shown), for sampling and converting the electrical output signals of the pixels, which can be measured in terms of voltage, to numeric or digital intensity data values which are proportional to the magnitudes of the measured voltages. The digitizing board means 76 is preferably similar to that sold by BITFLOW of Woburn, Mass.

The intensity data values correspond to the light intensities sampled at the pixels for a specific image sample and map out a sampled image /. An optical image sampled at the camera 72 is, thus, converted into a numerical map of the detected optical intensities. The digital intensity data for each optical image sample provides that the advance of the tubes 14 of the strand 54 past the camera 72 can be tracked based on the presence of light and dark areas in consecutive image samples.

The memory 38 of the microcontroller 34 includes suitable software to provide that the processor 36 can process the encoder pulses and the digital intensity data values representative of a sampled image to detect the apparent motion of the tubes between consecutive image samples and to identify the positions of S-Z reversals on the advancing strand, as explained below.

The marker 40 is ordinarily positioned at least 10 meters away from the camera 72 or, more generally, at a position along the line 59 following the position where an S-Z reversal or, alternatively, a characteristic marking, such as a luminescent ink marking, on the strand 54 is detected.

In operation, the system 70 obtains optical images of the strand 54 before the strand 54 undergoes substantial processing related to cable manufacture that would minimize the opportunity for identifying S-Z reversals. The system 70 then marks the outer jacketing applied to the strand 54 during manufacture of the cable 67 to identify thereon positions of S-Z reversals within the cable 67. The system 70 identifies S-Z reversals on the strand 54 by detecting the intensity of optical reflections from the strand 54 at the camera 72, sampling the electrical outputs provided at the pixels of the camera 72 at a predetermined sampling rate, generating digital image intensity data values representative of the pixel outputs for the sampled images and then processing the digital image intensity data values which map the sampled images. Further, the system 70, based on the identification of the positions of S-Z reversals on the strand 54, causes printing of indicia on the external sheath 65 of the cable 67 at positions corresponding to the identified S-Z reversals on the strand 54. It is to be understood that the present inventive system 70 can be used for identifying the positions of other structural or characteristic features on a longitudinally advancing strand and for marking the advancing optical fiber cable, based on the identified positions of the features, at positions other than those corresponding to the features identified.

For purposes of illustration, the system 70 identifies the positions of S-Z reversals on the strand 54 and marks the cable 67 at positions corresponding to the identified reversal positions, based on the identifications of the positions of the S-Z reversals, in accordance with an optical image detection and processing method 100 shown in FIG. 3 and the sub-processes shown in FIGS. 4–9.

Referring to FIG. 3, the process 100 sets forth the steps that the processor 36 performs to control operations in the system 70 which are related to identifying S-Z reversals on the strand 54 and marking the cable 67 accordingly at the S-Z reversals based on the S-Z reversal identifications. The operations include sampling optical images of the strand 54 as the strand 54 advances on the path 59 past the camera 72, processing digital intensity image data values derived from the sampled optical images to identify positions of S-Z reversals along the strand 54 and, subsequently, marking the external sheath 65 of the cable 67 at positions which overlie the S-Z reversals on the strand 54.

Referring to FIG. 3, in step 102, the processor 36 transmits control signals to the camera 72 that cause the intensity of the optical radiation received in the pixels of the camera 72 to be sampled. To prevent an invalid computation of apparent motion of the strand 54, which is determined as part of the step of identifying an image sample with an S-Z reversal and set forth in step 104 of the process 100, the sampling rate must equal or exceed a rate that ensures that the bright spot corresponding to a tube is sampled before the bright spot can move, in consecutive images samples and laterally with respect to the line 59, a distance equal to one-half a tube diameter. The sampling rate is, thus, defined as a function of the speed that the strand 54 is advanced along the cabling line 59, the width of the strand 54 and the pitch or lay length of the tubes 14 in the strand 54.

Further in step 102, the processor 36 provides control signals to the camera 72 that direct the digitizing board means 76 to convert the electrical output signals generated by the pixels, when sampled, into corresponding digital intensity data values. The board means 76 continuously supplies to the microcontroller 34 the digital intensity data for the images sampled. The processor 36 stores in the memory 38 a record of the digital intensity data values which map an image sample in array $I_{Frm,Pxl}$, where Frm is equal to the sample number for a sampled image and Pxl designates the particular pixel $75_{Pxl}$ from which the intensity data value was obtained in an image sample Frm. The value of Frm is initially set equal to zero in the memory 38 before the system 70 begins operation. The processor 36 increments the value in Frm by one each time an optical image sample of the strand 54 is obtained. The values of Pxl range, of course, from 1 to the number of the pixels in the camera 72. Preferably, the diameter of the strand 54, before application of jacketing, is equal to a minimum of about 200 pixels and a maximum of about 900 pixels. Further, the image preferably is represented by the same number of digital intensity data values as there are pixels in the camera 72.

Also in step 102, the microcontroller 34 receives encoder pulses from the encoder 28 in accordance with the advance of the cable 67 along the cabling line 59. For each encoder pulse received at the microcontroller 34, the strand 54 has advanced along the line 59 a predetermined distance since the preceding encoder pulse. The processor 36 begins to count the encoder pulses as they are received from the encoder 28 once the processor 36 initiates sampling of optical images at the camera 72. The processor 36 stores in the location Cnt the sequential number of the encoder pulse which was last received at the microcontroller 34. Cnt is initially set equal to the value "1". The processor 36 increments Cnt for each encoder pulse received starting with the encoder pulse received after the processor 36 transmits the control signals to the camera 72 for sampling a first optical image. The processor 36 stores the current value of Cnt at the location I(Frm) in the memory 38 when the processor 36 transmits a control signal for sampling an image. For example, for the first sampled image, Frm is equal to 1 and the value of Cnt, which is also equal to 1 at the first sampled image, is stored in I(Frm).

In step 104, the processor 36 retrieves the image data $I_{Frm,Pxl}$ from the memory 38 to determine apparent motion of the tubes 14 in the strand 54 between consecutive image samples. In determining the apparent motion, the processor 36 evaluates the intensity data for consecutive images and quantifies any lateral movement or vibration of the strand 54 as the strand 54 passes under the camera 72. Although the strand 54 is held tautly between the spools 52 and 56 along the line 59, because the width of the line 59 is usually approximately twice that of the strand 54, perturbations of the strand 54 can occur during cable manufacture. These perturbations are caused by the operation of the mechanical components of the system 50 along the line 59 and can cause a translational or lateral shift of the strand 54 relative to the pixels of the camera 72. If the strand 54 experiences such a shift, the strand 54 will not pass under the pixels of the camera 72 at the same position, i.e., opposite the same pixels, for consecutive images. The processor 36 determines how much, if it all, the strand 54 has laterally shifted between consecutive images. The processor 36 compensates the intensity data obtained for an image sample according to any detected shift to ensure that any lateral shift of the strand relative to the pixels of the camera 72 is not incorrectly identified as an S-Z reversal of the buffer tubes 14 along the strand 54. After the processor 36 adjusts the intensity data for a particular image sample to account for any lateral shift of the strand 54, the processor 36 determines the similarities between the consecutive image samples. Step 104 is comprised of an exemplary subprocess 104A which includes steps 120 through 136, as shown in FIG. 4.

Figure 4:
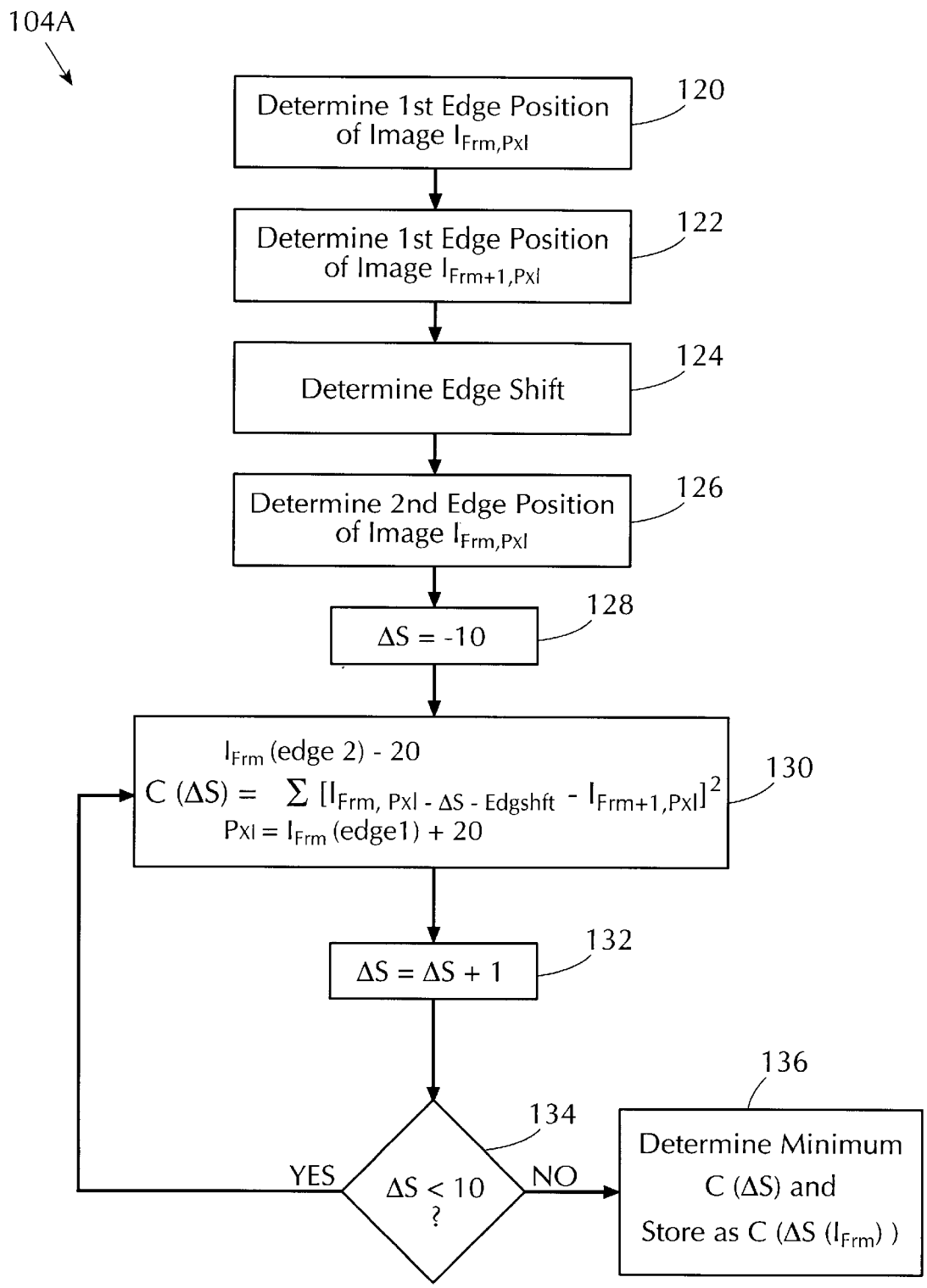
FIG. 4 is a flow diagram of a method for determining apparent motion of the buffer tubes of the advancing cable shown in FIG. 2A based on optical image samples of the strand.

Referring to FIG. 4, in step 120, the processor 36 retrieves from the memory 38 the intensity data in $I_{Frm,Pxl}$ for a first image sample Frm=1 and determines a first edge position for the image sample. A first edge position of an image is the intensity data value which corresponds to the pixel that is at one edge of the image sample and which maps a digital value for the image exceeding or equal to a predetermined data value ON that is stored in the memory 38. In one embodiment, the mapped digital values for pixels in the camera 72, starting from the pixel 75, and continuing successively to the pixels corresponding to $75_2$, $75_3$, etc., are compared to the value stored in ON. The processor 36 saves at location $I_{Frm}(\text{edge1})$ in the memory 38 the value of Pxl for the pixel $75_{Pxl}$ which first satisfies the ON value criteria.

In step 122, the processor 36 retrieves from the memory 38 the intensity data for the next consecutive image sample $I_{Frm+1,Pxl}$, determines a first edge position for that image sample and saves the numerical designation of the pixel identified as the first edge position in the memory 38 at location $I_{Frm+1}(\text{edge1})$. In step 124, the processor 36 determines the edge or lateral shift, if any, between the consecutive image samples by computing the difference between $I_{Frm+1}(\text{edge1})$ and $I_{Frm}(\text{edge1})$. The processor 36 stores the absolute value of the difference at location Edgshft in the memory 38.

In step 126, the processor 36 determines the second edge position for the image $I_{Frm,Pxl}$. The second edge position constitutes the pixel, starting from the pixels in the camera 72 corresponding to the pixels $75_P$, $75_{P-1}$, $75_{P-2}$, etc., which had an electrical output corresponding to an intensity value greater than or equal to ON, where P is equal to the number of pixels in the linear sensor of the camera 72. The processor 36 saves the numerical designation of that pixel 75 in the memory 38 at location $I_{Frm}(\text{edge2})$.

In steps 128 through 134, the processor 36 computes the best correlation between the consecutive image samples by comparing the digital intensity data values corresponding to the pixels for the image sample Frm, translated a predetermined number of pixels in the image sample or, in other words, several pixels linearly along the line of pixels, to the digital intensity data values of the corresponding pixels in the image sample Frm+1.

In particular, in step 128, the processor 36 sets a location Δs in the memory 38 equal to −10. Δs, as explained below, represents the number of positions that the digital intensity data value which corresponds to a pixel in a first image sample is translated in both lateral directions relative to the longitudinal cabling line 59, in other words, along the line of pixels of the camera 72. This lateral translation allows for comparison of the digital intensity data value which corresponds to a pixel in the first image sample to the digital intensity data value which corresponds to a pixel in the next consecutive image sample, where the pixel in the next image sample is translated laterally by Δs positions from the position of the pixel in the first image sample. In step 130, the processor 36 computes a correlation coefficient, C(Δs), for each of the pixel translations examined according to the equation:

$$C(\Delta s) = \sum_{Pxl=I_{Frm}(edge1)+20}^{I_{Frm}(edge2)-20} [I_{Frm,Pxl-\Delta s-Edgshft} - I_{Frm+1,Pxl}]^2, \quad (1)$$

and stores the results in the memory 38.

In step 132, the processor 36 increments the value of Δs by one. In step 134, the processor 36 determines whether Δs is less than 10. If yes, the processor 36 proceeds to step 130 and performs the correlation calculation for another translation. Otherwise, in step 136, the processor 36 determines which of the values C(Δs) stored in the memory 38 is the smallest and stores that value in the memory 38 at location C(Δs(I$_{Frm}$)). The smallest correlation coefficient value corresponds to the best estimate of the translation of the intensity data for the image sample Frm upon the intensity data of the next consecutive image sample Frm+1. Thus, the value Δs for C(Δs(I$_{Frm}$)) corresponds to the best approximation of the number of pixels that the image sample Frm is shifted laterally across the line of pixels of the camera 72, with respect to the next consecutive image sample Frm+1, as a result of movement of the strand 54 along the line 59 opposite to and past the camera 72. The processor 36 then proceeds to step 106. It is to be understood that the processor 36 continuously performs the subprocess 104A as intensity data values for image samples are stored in the memory 38.

In step 106, the processor 36 retrieves from the memory 38 intensity data for several consecutive image samples to identify whether the portion of the strand 54 represented in an image sample includes an S-Z reversal. The processor 36 then stores in the memory 38 the position on the strand 54 which corresponds to the image sample having an identified reversal. In particular, the processor 36 computes a moving average of data values representative of the best correlation coefficient for an image sample using the best correlation coefficients for consecutively preceding and succeeding image samples. The moving average calculation smoothes the correlation data values which constitute noise in the intensity data and can incorrectly indicate that an S-Z reversal is present at a position on the strand when, in fact, an S-Z reversal is not present at the position. Noise in the intensity data can be caused, for example, by dust on the lens, dirt smudges on the target cable, odd optical reflections and electrical noise. As discussed below, the processor 36 also determines the positive (+) or negative (−) direction of the identified reversal in an image sample, in other words, whether the reversal is from clockwise to counterclockwise stranding (+), or vice versa (−). In addition, the processor 36 performs several validation checks on the positions of the identified S-Z reversals 36 to decrease the probability that an identified reversal position does not correspond to an actual S-Z reversal of the tubes 14 of the strand 54.

Figure 5:
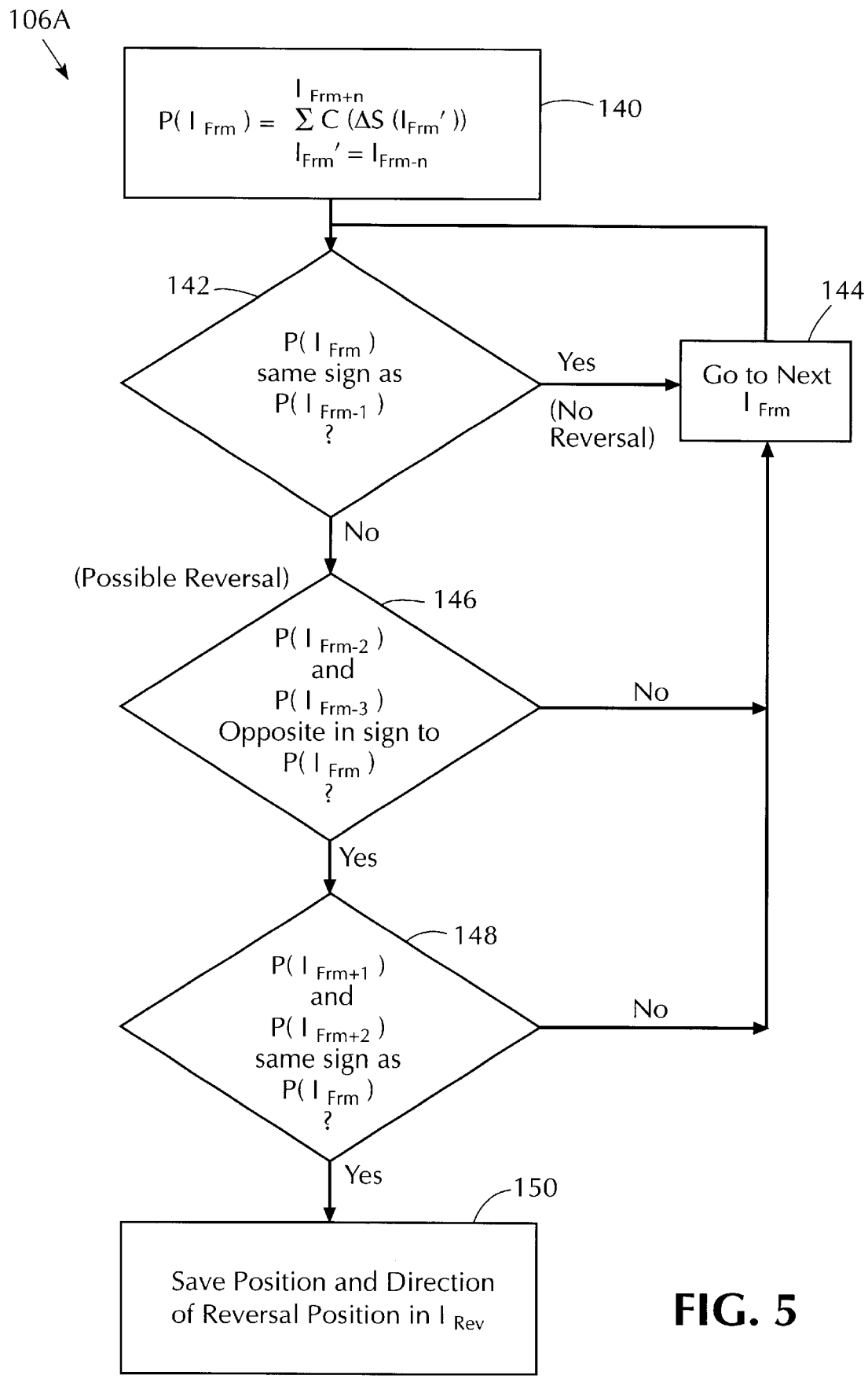
FIG. 5 is a flow diagram of a method for determining whether an optical image sample of a position on the strand of the advancing cable shown in FIG. 2A includes an S-Z reversal and for storing a record of the position of the identified reversal on the strand and the direction of the reversal.

Step 106 is comprised of steps 140 through 150 of an exemplary subprocess 106A, as shown in FIG. 5. Referring to FIG. 5, in step 140, the processor 36 computes a moving average coefficient value, P(I$_{Frm}$), for each of the images samples I$_{Frm}$ by summing the best correlation coefficients C(Δs(I$_{Frm}$)) of n consecutive succeeding and preceding image samples with the coefficient C(Δs(I$_{Frm}$)) of a subject image sample I$_{Frm}$, according to the equation:

$$P(I_{Frm}) = \sum_{I'_{Frm}=I_{Frm-n}}^{I_{Frm+n}} C(\Delta s(I'_{Frm})). \quad (2)$$

In step 142, the processor 36 determines whether P(I$_{Frm}$) has the same sign as P(I$_{Frm-1}$). If yes, the subject image sample I$_{Frm}$ does not include an S-Z reversal. The processor 36 then performs step 144 and retrieves data for performing step 142 for the next consecutive image sample stored in the memory 38.

If the condition of step 142 is not satisfied, in step 146, the processor 36 continues to check if the image I$_{Frm}$ includes a reversal by determining if P(I$_{Frm-2}$) and P(I$_{Frm-3}$) are both opposite in sign to P(I$_{Frm}$). If no, the processor 36 proceeds to step 144. If yes, the processor 36 proceeds to step 148 and further verifies whether the subject image sample I$_{Frm}$ includes a reversal.

In step 148, the processor 36 determines whether P(I$_{Frm+1}$) and P(I$_{Frm+2}$) have the same sign as P(I$_{Frm}$). If no, the image sample I$_{Frm}$ is deemed not to include an S-Z reversal and the processor 36 proceeds to step 144. Otherwise, an S-Z reversal has been identified and step 150 is performed.

In step 150, the processor 36 saves in the memory 38 the direction of the reversal for the image sample Frm at D$_{Frm}$ and a record of the position of the image sample I$_{Frm}$ on the strand 54 with the identified reversal at I$_{Rev}$. The value stored in D$_{Frm}$ is "1" if the values of the P(I$_{Frm+1}$) and P(I$_{Frm}$) are negative and positive, respectively, and "−1" if the values are positive and negative, respectively. I$_{Rev}$ represents the value stored in the memory 38 at I(Frm) for the image sample identified as having a reversal and Rev is initially set equal to "1" and incremented by one for each image sample identified as having a reversal. The processor 36 continuously performs the subprocess 106A as new correlation coefficient data for image samples are computed in the subprocess 104A.

After a predetermined number of image samples having reversals are identified in step 106, in step 108, the processor 36 further evaluates whether the position of an identified reversal on the strand 54 corresponds to the position on the strand 54 where a reversal would be expected occur. This evaluation is performed based on the identified positions of several S-Z reversals that immediately precede or succeed an image sample identified as having a reversal. If several validation criteria are satisfied pursuant to the evaluation, the processor 36 stores as a print position at a print buffer stack PPSN in the memory 38 the value in I(Frm) corresponding to the image sample having the validated identified reversal. The processor 36 subsequently uses the values in the stack PPSN to determine when to trigger the marker 40 to apply indicia on a position on the outer surface 65 of the cable 67 which overlies the position on the strand 54 where the reversal was identified.

Further in step 108, the processor 36 evaluates the identified reversals to determine whether a print position should be assigned even if the position of the reversal has not been validated. In particular, the processor 36 examines the positions of other image samples with identified reversals to determine whether a reversal should exist on the strand 54 in the vicinity of the position of an image sample which has an identified reversal but was not validated. The processor 36 stores a print position at PPSN based on the relationship of the position of the image sample with the non-validated identified reversal to the relationships between the positions of consecutive image samples with identified reversals and an expected pattern for positions of S-Z reversals on a strand of S-Z stranded tubes. Step 108 is comprised of steps 160 through 170 of the subprocess 108A, as shown in FIG. 6.

Figure 6:
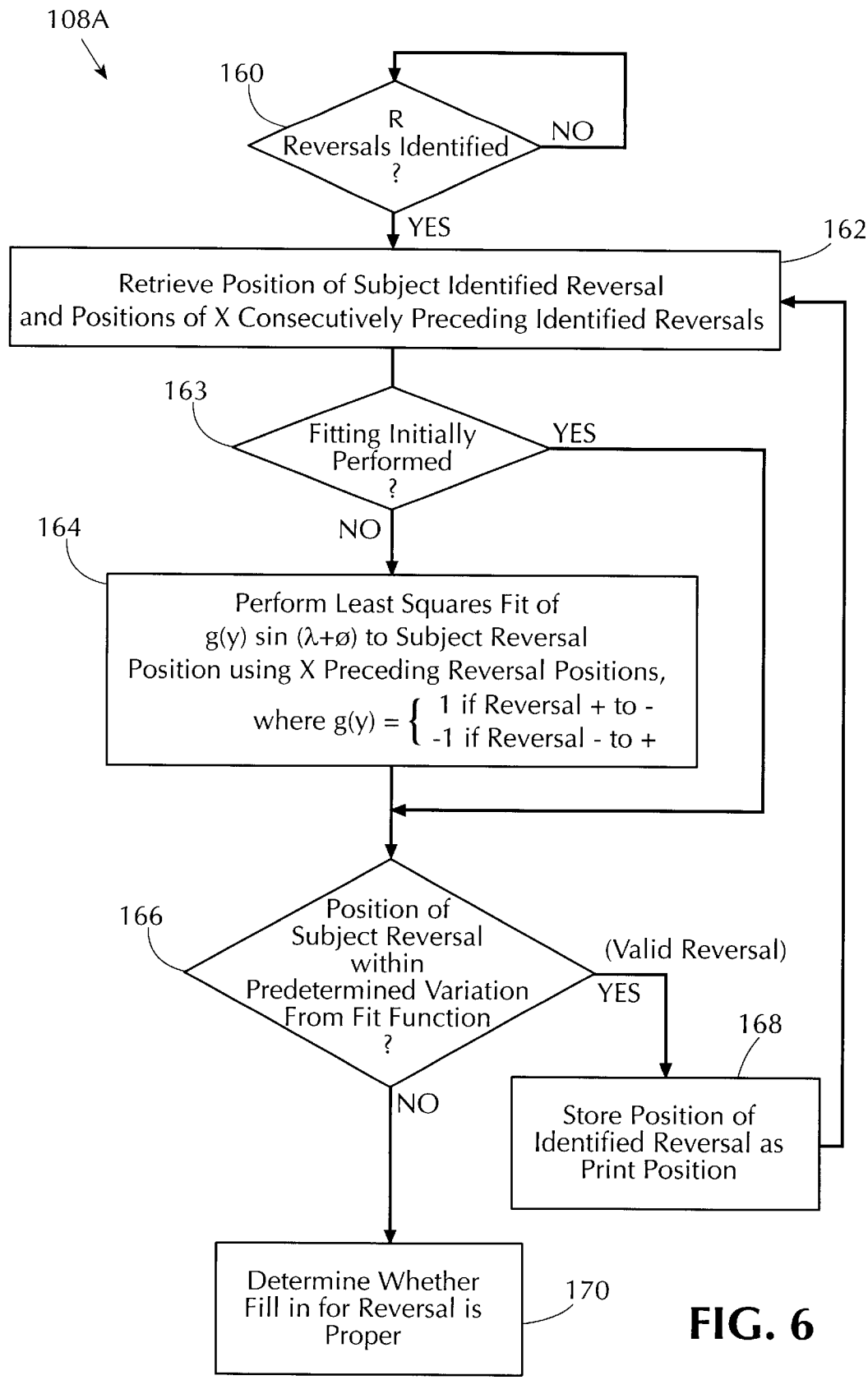
FIG. 6 is a flow diagram of a method for determining whether a position on the strand of the advancing cable shown in FIG. 2A and identified as having a reversal satisfies validation criteria, and for assigning a print position based on the results of the validation.

Referring to FIG. 6, in step 160, the processor 36 determines from the memory 38 whether at least R reversal positions have been identified, where R is preferably greater than ten. After at least R reversal positions have been identified, the processor 36 proceeds to step 162.

In step 162, the processor 36 retrieves from the memory 38 data representative of the position of the next consecutive image sample having an identified reversal and not previously validated, or a subject image sample. The processor 36 also retrieves from the memory 38 the positions of X consecutive image samples preceding the subject image sample and identified as having a reversal.

In step 163, the processor 36 determines whether the positions of the image samples of the strand with identified reversals have been initially evaluated with respect to a fit function related to S-Z stranding, as explained in detail below at step 164. If yes, the processor 36 performs step 166. Otherwise, the processor 36 performs step 164.

In step 164, the processor 36 evaluates the interrelationship among the positions of the subject image sample and of the X preceding image samples with identified reversals. In particular, the processor 36 attempts to fit the positions of the X preceding identified reversals to a sine function representative of the expected periodic pattern of S-Z reversals in a strand of S-Z stranded buffer tubes by performing a least squares fit analysis on the positions using the sine function. It is to be understood that any function which provides for correlation of periodicity, such as a square wave or a saw tooth wave function, can be used as the function to be fit to consecutively identified reversal positions. For purposes of illustration, in step 164, the processor 36 attempts to fit the positions of the subject image sample and the X preceding image samples to a first fit function $g(y)\sin(\lambda+\phi)$, where $g(y)$ is equal to "1" where there is a positive reversal and "−1" where there is a negative reversal at the subject image sample, where $\lambda$ is equal to the wavelength interval or length between consecutive positive or negative reversals and where 97 is equal to a phase angle related to the periodic detection of S-Z reversals on the moving strand at the camera 72 and the expected positions of S-Z reversals on the strand as defined by the first fit function.

In step 166, the processor 36 computes the variation between the position of the subject image sample on the strand and an expected corresponding position defined by the first fit function, and determines whether the variation does not exceed an individual variation limit. If the variation does not exceed the individual variation limit, the reversal identified for the subject image sample is deemed valid and, in step 168, the processor 36 stores in the memory 38 the position of the subject image sample Frm, ie., the value in I(Frm), as a print position at PPSN. After step 168, the processor 36 proceeds to step 162. On the other hand, if the position of the subject image sample does not satisfy the validation criteria of step 166, the processor 36 proceeds to step 170.

In step 170, the processor 36 examines the positions of several consecutive image samples having identified reversals that immediately follow the subject image sample to determine whether the subject image sample, which has been found to not satisfy the validation criteria of step 166 of the subprocess 108A, should be assigned a print position. If it is determined that assignment of a print position is proper, a position for marking the external sheath 65 of the cable 67 is computed as described below. Further in step 170, the processor 36 determines whether the failure to satisfy the validation criteria was caused by an actual perturbation in the S-Z stranding of the strand 54, such as, a slip in the strand or cable along the line 59. If yes, the angle $\phi$ in the first fit function is adjusted to compensate for the perturbation and to allow for subsequent marking of the sheath 65 of the cable 67 in accordance with the identified positions of reversals on the strand 54 which would be validated using the adjusted first fit function.

Figure 7:
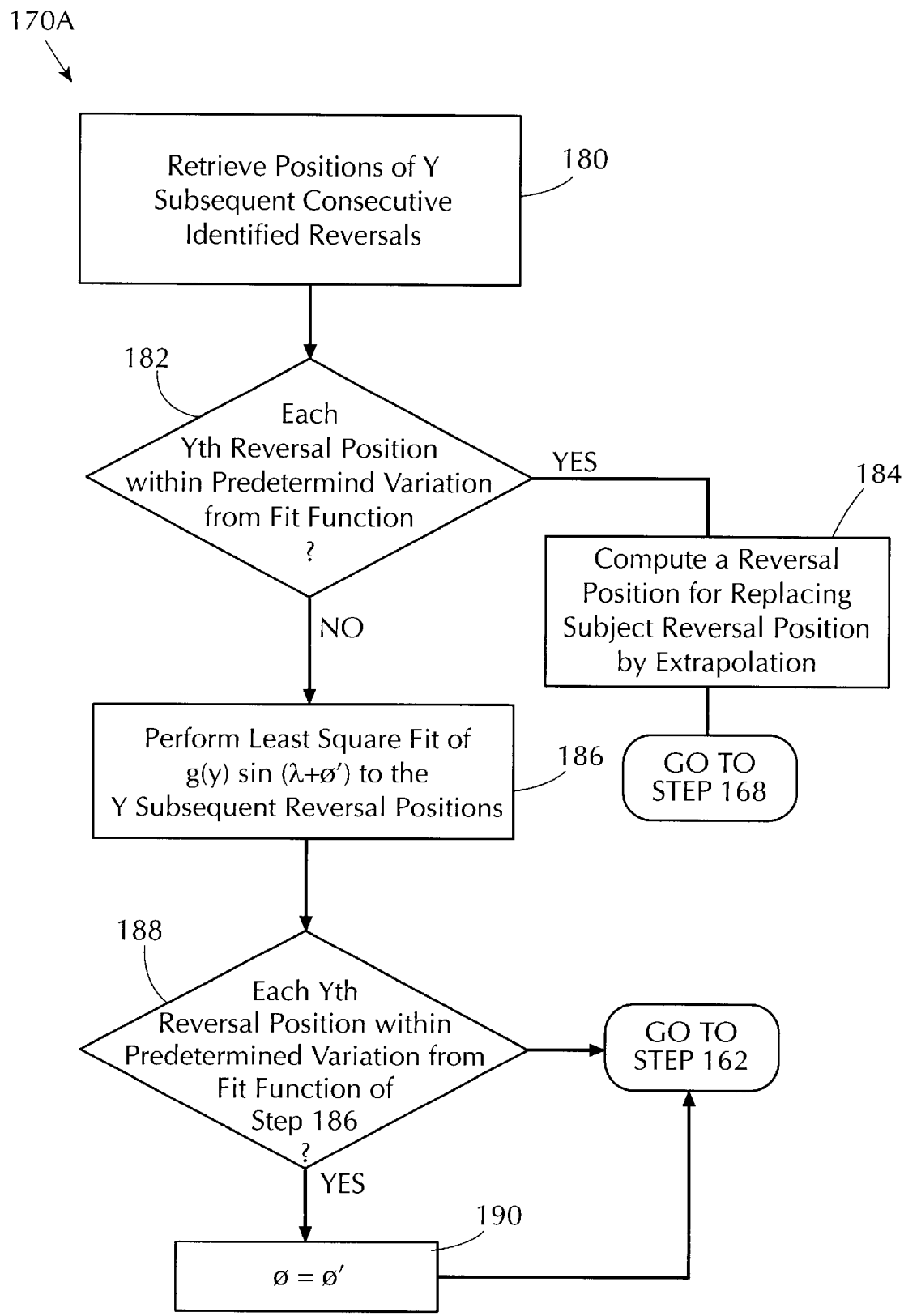
FIG. 7 is a flow diagram of a method for determining whether a print position can be assigned for an identified reversal position on the strand of the advancing cable shown in FIG. 2A where the identified reversal position does not satisfy the validation criteria of the method shown in FIG. 6.

Step 170 is comprised of steps 180 through 190 of an exemplary subprocess 170A, as shown in FIG. 7. Referring to FIG. 7, in step 180, the processor 36 retrieves from the memory 38 the positions corresponding to Y image samples having identified reversals which consecutively succeed the position of the current image sample with the non-validated reversal. In step 182, the processor 36 compares each of the Yth positions to expected position values defined by the first fit function of step 164, in the same manner as described above with respect to step 166, and determines if the position of each Yth subsequent reversal position value is within a predetermined variation of a corresponding position value defined by the first fit function. If yes, in step 184, the processor 36 computes by extrapolation a position of a reversal to replace the current, non-validated identified reversal position. The position can be extrapolated from the Y subsequently identified reversal positions, from preceding validated identified reversal positions or by derivation from the first fit function. The processor 36 then proceeds to step 168 and stores as a print position at PPSN the encoder pulse value which would be stored in Cnt for the position on the strand corresponding to the computed identified reversal position.

On the other hand, if the criteria of step 182 are not satisfied, in step 186, the processor 36 applies a second fit function $g(y)\sin(\lambda+\phi')$ to the Y subsequent reversal positions in the same manner as in step 164. Then in step 188, the processor 36 compares the positions of each of the Y subsequent reversals to the expected positions defined from the second fit function and determines, similarly as in step 182, if each of the variations between the Y reversal positions and the respective position values computed from the second fit function does not exceed a group variation limit. If each of the variations does not exceed a group variation limit, in step 190, the processor 36 sets the value of $\phi$ in the first fit function equal to $\phi'$. When the value of $\phi$ is set equal to the value in $\phi'$, typically, the periodic S-Z stranding of the buffer tubes, for whatever reason, has been interrupted. The phase of the periodic first fit function, therefore, is adjusted to account for the interruption in S-Z stranding and validation of subsequent identified reversal positions is performed using the first fit function having the adjusted $\phi$ value.

After step 190 or if the criteria of step 188 are not satisfied, the processor 36 proceeds to step 162. The processor 36 continuously assigns and stores print positions at PPSN in the memory 38 in step 168 based on the identified reversal positions.

It is known that positive and negative reversals, i.e., switches in the direction of S-Z stranding of tubes, respectively, may not have the same periodicity along a strand as a result of manufacturing tolerances. Also, a straight or non-stranded section of tubes can become interposed along the strand between S-Z stranded tube sections if S-Z stranding is not performed for an interval while the cable continues to move along the line. In view of such S-Z stranding phenomenon, the individual and group variation limits for the above process can be set to higher error values to avoid a false non-validation of a subject image sample with an identified reversal. If the limits are set at too high an error tolerance, the marking of the reversals on the strand or a covering on the strand becomes less precise, especially if markings are to be placed on multiple covering layers which are included in cable.

Figure 8:
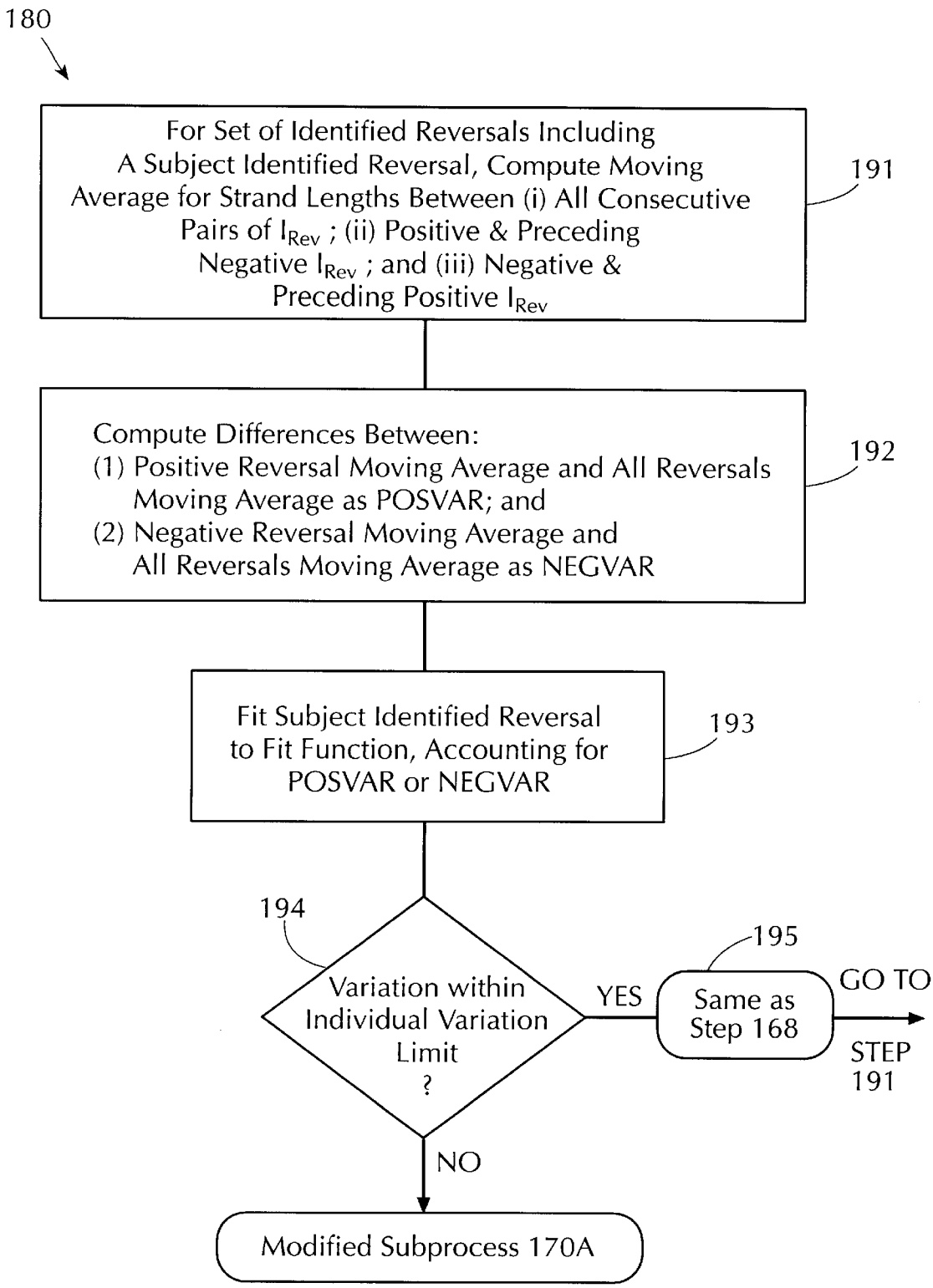
FIG. 8 is a flow diagram of a method for determining whether a position on the strand identified as having a reversal satisfies validation criteria which are computed based on the lengths of strand segments between identified reversals.

In a further preferred embodiment, the variation between the average lengths of strand segments between identified reversals and the average lengths of positively or negatively stranded segments, or strand segments between negative and positive and between positive and negative identified reversals on the strand, respectively, can be monitored as part of an exemplary sub-process 106B, as shown in FIG. 8, that improves marking precision. In the sub-process 106B, the periodicity of the identified strand reversals and the periodicity of each of the positive and negative identified reversals are evaluated to determine the regularity of variations in the periodicity of reversals as a function of stranding direction. The periodicity of the identified reversals preceding and succeeding a subject identified reversal provides an indication as to whether stranding occurs at the same rate on the strand before or after the subject identified reversal or whether a break in the stranding which represents a phase shift in the expected periodicity of the stranding has occurred. If a phase shift is detected, the particular segment of the strand causing the phase shift is not considered in the validation of reversals on the strand identified subsequent to the subject identified reversal.

Referring to FIG. 8, in step 191, assuming that a predetermined number of consecutive reversals, such as eleven, have been identified, the processor 36 computes a moving average $L(I_{Rev})$ for strand lengths between the pairs of consecutive identified reversals on the strand which precede a subject identified reversal $I_{Rev}$ and are included in a set St of Num consecutive identified reversals or St(Num), where Num is an odd number preferably exceeding eleven, according to the equation:

$$L(I_{Rev}) = \frac{\sum_{Step=0}^{Num-2}(I_{Rev-Step} - I_{Rev-Step-1})}{Num-1} \qquad (3)$$

Further, the processor 36 computes a moving average $L(I_{Rev/pos})$ for the strand lengths between the positive identified reversals and the respective preceding negative identified reversals in St(Num), and a moving average $L(I_{Rev/neg})$ for the strand lengths between the negative identified reversals and the respective preceding positive identified reversals in St(Num). If the subject identified reversal is positive (D=+1), then $L(I_{Rev/pos})$ and $L(I_{Rev/neg})$ are computed according to expressions 4 and 5, respectively, as follows:

$$\frac{\sum_{Step=0}^{Num-2(by+2)}(I_{Rev-Step} - I_{Rev-Step-1})}{(Num-1)/2}; \qquad (4)$$

and $$\frac{\sum_{Step=1}^{Num-2(by+2)}(I_{Rev-Step} - I_{Rev-Step-1})}{(Num-1)/2}. \qquad (5)$$

On the other hand, if the subject identified reversal is negative (D=−1), then $L(I_{Rev/pos})$ and $L(I_{Rev/neg})$ are computed according to expressions (5) and (4), respectively.

In step 192, the processor 36 computes for the subject identified reversal the difference PosVar between the calculated moving average for the positive identified reversals and all identified reversals, and the difference NegVar between the calculated moving average for the negative identified reversals and all identified reversals as follows:

$$\text{PosVar} = L(I_{Rev/pos}) - L(I_{Rev}) \qquad (6) \text{ and}$$

$$\text{NegVar} = L(I_{Rev/neg}) - L(I_{Rev}) \qquad (7),$$

and saves PosVar and NegVar in the memory 38.

In step 193, if the subject identified reversal is positive, the processor 36 evaluates the interrelationship among the positions of the subject identified reversal and the (Num−1)/2 consecutively preceding image samples having positive identified reversals, similarly as in step 164 above, by attempting to fit the positions of the subject identified reversal and the (Num−1)/2 preceding image samples with positive identified reversals to a first fit function $g(y)\sin(\lambda + \text{PosVar} + \phi)$. Alternatively, if the subject identified reversal is negative, the processor 36 evaluates the interrelationship among the positions of the subject identified reversal and the (Num−1)/2 consecutively preceding image samples having negative identified reversals by attempting to fit the positions of the subject identified reversal and the (Num−1)/2 preceding image samples with negative identified reversals to a first fit function $g(y)\sin(\lambda + \text{NegVar} + \phi)$.

In step 194, the processor 36 computes the variation between the position of the subject identified reversal on the strand and an expected corresponding position defined by the associated first fit function, and determines whether the variation does not exceed an individual variation limit similarly as in step 166. If the variation does not exceed the individual variation limit, the reversal identified is deemed valid and the processor 36 performs step 195, which is the same as step 168 above. After step 195, the processor 36 performs step 191 for the next consecutive identified reversal.

On the other hand, if the position of the subject identified reversal does not satisfy the validation criteria of step 194, the processor 36 can perform a sub-process similar to the sub-process 170A to determine whether a print position should be assigned to the subject identified reversal. The sub-process 170A can be suitably modified such that positive or negative identified reversals on the strand subsequent to the subject identified reversal are retrieved, as suitable, and the corresponding fit function accounts for PosVar or NegVar, as above.

Referring to FIG. 3 once again, in step 110, the processor 36 uses the data stored at Cnt, which indicates movement of the strand 54 along the line 59, and the values stored in PPSN for causing the marker 40 to print indicia at positions on the sheath 65 of the cable 67 that correspond to the identified reversal positions on the strand 54. Step 110 is comprised of steps 200 to 206 of subprocess 110A, as shown in FIG. 9.

Referring to FIG. 9, in step 200, the processor 36 retrieves from the memory 38 each of the print positions in PPSN. For simplicity, it is assumed that the processor 36 retrieves the print positions in PPSN shortly after they are stored in the memory 38 and in sufficient time to permit the processor 36 to transmit a trigger signal to the marker 40 to cause the marker to print indicia on the sheath 65 of the cable 67 at a position corresponding to an S-Z reversal, based on the identified reversal positions.

In step 202, the processor 36 computes the sum of each of the print positions and ADJ. ADJ is equal to the number of encoder pulses that would be generated as a position on the strand 54 advances from the camera 72 to the marker 40.

In step 204, the processor 36 continuously compares the current value of Cnt to each of the sums computed in step 202. The processor 36 then performs step 206 and transmits a trigger signal to the marker 40 when the sum of a print position in PPSN and ADJ is equal to the current value of Cnt. The trigger signal causes the marker 40 to print indicia on the cable 67. It is to be understood that the values of the print positions are suitably adjusted to account for time lag in processing and signal transmission between the microcontroller 34 and the marker 40. This adjustment ensures that the marking occurs in precisely the desired position on the cable 67, based on the S-Z reversal identifications. In an alternative embodiment, the value of ADJ is suitably adjusted to a higher value than that representative of strand advance from the camera 72 to the marker 40 to compensate for any delay in marking by the marker 40 based on the response time of the marker 40 to the trigger signal. The processor 36 continuously performs the subprocess 110A to determine when the position on the strand 54 opposite the marker 40 corresponds to the next stored print position.

In another embodiment, the system 70 also includes a luminescent sensor 74 which is connected to the microcontroller 34 and positioned along the cabling line 59 preceding the wax applicator 62 and following the camera 72. The luminescent sensor 74 includes linearly arranged luminescent light sensitive sensors which solely detect the intensity of luminescent reflections from the strand 54 as the strand 54 advances past the sensor 74. The luminescent reflections can be caused by luminescent paint or ink which has been applied on the strand 54 in accordance with the techniques described above for the system 10. The sensor 74 can be of the type sold by Sick Optic of Eden Prairie, Minn. The sensor 74 is particularly and preferably useful when the strand 54 includes luminescent markings at the S-Z reversals, such as those applied in the system 10.

The positions of the luminescent ink markings on the strand can be identified using optical detection and processing techniques similar to those described above for the camera 72. These identifications allow marking of jacketing that is subsequently applied to the strand at positions that correspond to the positions identified on the strand having the luminescent markings, i.e., the S-Z reversals. For example, the processor 36 samples the sensor 74 to determine if a predetermined luminescent level has been detected for an image sample while contemporaneously monitoring the values in Cnt. When the predetermined luminescent level has been detected, the processor 36 then stores the value of Cnt associated with the sampling of the sensor 74 as a print position at PPSN. It is assumed that the processor 36 has already begun, or begins, to increment Cnt when the first predetermined luminescent level is detected.

In an alternative embodiment of the system 50, the spool 52 is identical to and interchangeable with the take-up spool 18 of the system 10 and, thus, the system 50 is supplied with a strand having luminescent ink markings on a tape covering at the S-Z reversals.

In still another embodiment of the system 70, a character printer 82 is positioned along the cabling line 59 between the cooling trough 68 and the marker 40. The printer 82 is coupled to the microcontroller 34 by signal lines. The printer 82 provides that additional markings can be applied on the cable 67, based on the identified reversal positions and the movement of the strand 54 along the line 59. The printer 82 is of the type sold by Wiedenbach America of Poway, Calif.

In a further embodiment of the system 70, the microcontroller 34 is programmed to provide that the pixels of the linear sensor camera 72 are sampled at a rate slower than the Nyquist rate. The processor 36 then processes the intensity data values obtained using a measurement technique called gray scale identification to determine the sharpness or blurring of the buffer tubes represented in the detected images. The sampling rate of the camera is suitably set at the slower rate so that the strand moves along the line 59 during cabling at a speed that provides that, during rotation of the tubes of the strand in the S or Z direction, the camera can capture a defined image of the strand comprised of bright spots, representatives of the tubes and which are of high contrast, and darkened spots, representative of the edges of the tubes and which are of low contrast. An image sample obtained when an S-Z reversal on a strand is opposite the line of sensors would include high contrast intensity data representative of a tube. At such sampling instant, there is no lateral or rotational motion of the tubes relative to the line of sensors because the tubes are perpendicular to the line of sensors and the tubes are arranged parallel to each other relative to the line of sensors.

In contrast, when a non-S-Z reversal position in the strand is opposite the line of sensors, the intensity data of an image sample for that position on the strand would represent the occurrence of overlap of the bright spots reflected from the tubes. Also, narrowly defined peaks, corresponding to the tubes, would not be evident in the intensity data for the image sample. This phenomenon occurs because the camera does not capture an image of the tubes traveling perpendicular to the array of sensors and, therefore, the image captured is a low contrast image. Thus, there is higher contrast in the intensity data for an image sample obtained when the strand is at the S-Z reversal position opposite the line of sensors than in an image sample of the strand whose buffer tubes are twisting at the point that the strand is sampled by the line of sensors.

The microcontroller 34 can be programmed to provide that the processor 36 detects the contrast, i.e., sharpness or blurring, in an image sample by comparing intensity data values representative of the image sample to a peak threshold value, THR. The peak threshold value THR is set in relation to the exposure time, or the sampling rate, of the pixels. The duration of the exposure time is limited by the precision with which an S-Z reversal is to be identified on the strand, hereinafter called spatial resolution. Although a longer exposure time, or slower sampling rate, can enhance the contrast in an image sample, spatial resolution is adversely affected and degraded if the sampling rate is too slow.

An optimal sampling rate provides for the greatest precision in the detection of the position of the S-Z reversal and the greatest efficiency in cable manufacture. The speed of the strand on the line 59 is a function of a velocity ratio, which is defined as the width of a tube in pixels divided by the apparent velocity induced by the twisting of the tubes. The apparent velocity is the product of the stranding pitch and the line speed. An S-Z reversal can be identified, for example, by comparing THR to the intensity data value of one or a predetermined number of pixels of an image sample. When an image sample has an intensity data value equal to or exceeding the peak threshold THR, the image sample is identified as having an S-Z reversal and the position on the strand from which the image sample is obtained can be tracked as the strand moves along the cabling line, as described above. The marker can then be triggered to mark the cable, accordingly.

In a further embodiment, the camera 72 is a full array camera. An image sample would be mapped by intensity data obtained from multiple lines of sensors, each similar or identical to the line of sensors in the camera discussed above. The process 100 would be performed similarly as described above, except that processing time can be decreased because the optical image sample of the strand can be evaluated by processing the intensity data representative of only a few of the lines of the sensors to determine whether any part of the image sample is likely to contain an S-Z reversal.

In still another preferred embodiment, the camera 72 is a color camera and detection of an S-Z reversal is performed based on the coloring present on one or more of the buffer tubes. The color camera 72 includes or is associated with a means for performing optical reflected light detection on diametrically opposing sides of the strand at the same position on the line 59. The color camera 72, for example, can include a line of sensors on opposite sides of the strand, or a mirror can be placed at each of the opposite sides to cause light reflected from a side of the strand to be focused onto a respective line of sensors. Opposite sides of the strand must be monitored to detect the position of an S-Z reversal on the strand based on color, because the alignment of the strand with respect to the path 59 can result in a particular tube always passing on a side of the strand which faces a particular mirror or line of sensors. It is to be understood that the mirrors and the lines of sensors to be used for obtaining intensity data values must be arranged so that the optical path from the strand to the lines of sensors is the same for each of the opposite sides of the strand.

In operation, the two opposing lines of color sensors in the color camera 72 are sampled and the detected optical radiation intensity levels are converted to digital intensity data values representative of a color tint using known intensity data processing operations for color images. The use of the color camera 72 allows that the strand 54 can be sampled at a rate which is slower than the Nyquist frequency that is required to identify the advance of tubes past the camera 72 in relation to the S-Z reversals of the S-Z stranded tubes. The process 100 can be performed generally in the same manner as described above, except that the computation of the apparent motion between consecutive image samples would involve resolving the latent movement of the buffer tubes, based on the colors detected in the intensity data for a line of sensors. This technique of resolving colors in an image sample is well known in the art and is readily applicable to the method 100, and in particular, the subprocess 104A, for computing correlation coefficients C(Δs). Consequently, individual tubes in a strand, which are typically color coded, advantageously can be identified even if the tube has moved a full tube width from one image to the next consecutive image.

In one preferred embodiment, the processor 36 compares the intensity values for an image sample to a color threshold value COL. The color threshold value COL, for example, can correspond to the value for a single color, such as blue. One or more of the pixels in the line of sensors would capture light representative of the single color only when an S-Z reversal is opposite the color camera 72 for reasons analogous to the reasons that a high contrast condition is present for the gray-scale embodiment described above when the S-Z reversal is situated opposite the line of sensors. Thus, an intensity data value would be equal to the color represented by a threshold value COL, i.e., a single color value would be detected, only when an S-Z reversal is opposite the line of sensors.

Although the intensity data value representative of a single pixel can be compared to COL, in another preferred embodiment, the intensity data values for several pixels in one or more image samples can be required to attain the required color threshold value COL before the determination is made that an image sample has an S-Z reversal.

Although preferred embodiments of the present invention have been described and illustrated, it will be apparent to those skilled in the art that various modifications may be made without departing from the principles of the invention.

We claim:

1. A method for identifying an S-Z reversal feature on an optical fiber cable including a strand of optical fiber media which is stranded with S-Z reversals and which is advanced longitudinally and for marking the advancing cable based on the identification of the S-Z reversal feature, the method comprising the steps of:

advancing the cable on a path extending from a first position to a second position;

monitoring the advance of the cable on the path;

detecting an S-Z reversal feature on the strand at a selected position on the path which is not the same as the second position using an optical reflected light sensor, wherein the detecting includes obtaining optical image samples of the strand and generating digital intensity image data representative of the image samples; and applying indicia to a desired position on the cable at a position along the path spaced from the selected position in the direction of advance of the cable based on the detection of the S-Z reversal feature on the strand at the selected position and the monitoring of the advance of the cable on the path.

2. The method of claim 1 further comprising creating an S-Z reversal on the strand at the selected position.

3. The method of claim 1, wherein the desired position on the strand corresponds to the position of the detected S-Z reversal feature on the strand.

4. The method of claim 3, wherein the indicia is luminescent ink or paint.

5. The method of claim 1 further comprising providing a jacketing on the strand at a position on the path subsequent the selected position, and wherein the applying further comprises applying the indicia to the jacketing on the strand at a desired position corresponding to the position of the S-Z reversal feature on the strand.

6. The method of claim 5, wherein the strand includes S-Z reversal features marked with a luminescent marking and wherein the detecting further comprises detecting the luminescent markings on the strand.

7. The method of claim 1, wherein the strand comprises S-Z stranded buffer tubes, wherein each of the tubes contains at least one optical fiber.

8. The method of claim 6, wherein the strand comprises S-Z stranded buffer tubes, wherein each of the tubes contains at least one optical fiber and wherein the luminescent marking is on the strand at a position corresponding to an S-Z reversal of the buffer tubes in the strand.

9. A system for identifying an S-Z reversal feature on an optical fiber cable including a strand of optical fiber media which is stranded with S-Z reversals and which is advanced longitudinally and for marking the advancing cable based on the identification of the S-Z reversal feature, the system comprising:

a driver for advancing the cable on a path extending between a first position and a second position and for generating encoder pulses representative of the advance of the cable on the path from the first position to the second position;

a detector positioned at a selected position on the path which is not the same as the second position for detecting an S-Z reversal feature on the strand, wherein the detector comprises an optical reflected light sensor, wherein the sensor obtains optical image samples of the strand and generates digital intensity image data representative of the image samples;

a marker positioned at a position along the path spaced from the selected position in the direction of the advance of the cable for applying indicia to the cable upon receipt of a marking signal; and a microcontroller coupled to the driver, the detector and the marker, wherein the microcontroller processes the intensity data for identifying image samples having an S-Z reversal feature, and wherein the microcontroller, based on the encoder pulses generated by the driver and the identification of image samples having the S-Z reversal feature, determines a position on the strand having the detected feature and transmits a marking signal to the marker to cause the marker to apply the indicia at a desired position on the strand.

10. The system of claim 9, wherein the desired position on the strand corresponds to the position of the detected S-Z reversal feature on the strand.

11. The system of claim 10, wherein the indicia is luminescent ink.

12. The system of claim 10, wherein the strand includes S-Z reversal features marked with a luminescent marking and wherein the detector further comprises a luminescent sensor capable of detecting the luminescent markings on the strand.

13. A method for identifying a characteristic feature on a generally longitudinal member which is advanced longitudinally and marking the advancing member based on the identification of the feature, the method comprising the steps of:

advancing the member on a path extending from a first position to a second position;

monitoring the advance of the member on the path;

detecting the feature on the member at a selected position on the path which is not the same as the second position, wherein the detecting comprises obtaining optical image samples of the member, generating digital intensity data representative of the optical image samples and processing the intensity data for identifying an image sample including the feature; and applying indicia to a desired position on the member at a position along the path spaced from the selected position in the direction of advance of the member based on the detection of the feature on the member at the selected position and the monitoring of the advance of the member on the path.

14. A system for identifying a characteristic feature on a generally longitudinal member which is advanced longitudinally and marking the advancing member based on the identification of the feature, the system comprising:

a driver for advancing the member on a path extending from a first position to a second position and for generating encoder pulses representative of the advance of the member on the path from the first position to the second position;

a detector positioned at a selected position on the path which is not the same as the second position for detecting the feature on the member, wherein the detector comprises an optical reflected light sensor, wherein the sensor obtains optical image samples of the member and generates digital intensity image data representative of the image samples;

a marker positioned at a position along the path spaced from the selected position in the direction of the advance of the member for applying indicia to the member based on receipt of a marking signal; and a microcontroller coupled to the driver, the detector and the marker, wherein the microcontroller processes the intensity data for identifying an image sample having the feature, and wherein the microcontroller, based on the encoder pulses generated by the driver and the identification of an image sample having the feature, determines a position on the member having the detected feature and transmits a marking signal to the marker to cause the marker to apply the indicia at a desired position on the member.

15. An optical image detection and processing method for identifying an S-Z reversal feature on an optical fiber cable including a strand of S-Z stranded optical fiber buffer tubes which is advanced longitudinally, comprising:

advancing the cable along a path extending from a first position to a second position;

monitoring the advance of the cable along the path;

obtaining optical image samples of the strand at a selected position on the path which is not the same as the second position;

generating digital intensity data representative of the respective image samples; and processing the digital intensity data for identifying an image sample having an S-Z reversal feature.

16. The method of claim 15, wherein the processing comprises:

determining apparent motion between a subject image sample and the image sample which consecutively succeeds the subject image sample; and computing a correlation coefficient for the subject image sample representative of the best correlation between the intensity data of the subject image sample and the consecutive succeeding image sample.

17. The method of claim 16, wherein the processing further comprises:

computing an average correlation coefficient for the subject image sample from the correlation coefficients of a predetermined number of image samples which consecutively precede and succeed the subject image sample;

comparing the average correlation coefficients of the subject image sample and a first image sample which consecutively precedes the subject image sample; and determining that the subject image sample does not include an S-Z reversal feature if the signs of the average correlation coefficients for the subject image sample and the first image sample are the same.

18. The method of claim 17, wherein the processing further comprises:

comparing the signs of average correlation coefficients for a second image sample which consecutively precedes the first image sample and a third image sample which consecutively precedes the second image sample if the signs of the subject image sample and the first image sample are not the same; and determining that the subject image sample does not include an S-Z reversal if the signs of the average correlation coefficients of the second and third image samples are not opposite in sign to the sign of the average correlation coefficient of the subject image sample.

19. The method of claim 18, wherein the processing further comprises:
  comparing the signs of the average correlation coefficients for a fourth image sample which consecutively succeeds the subject image sample and a fifth image sample which consecutively succeeds the fourth image sample if the signs of the average correlation coefficients of the second and third image samples are opposite in sign to the sign of the average correlation coefficient of the subject image sample; and
  identifying the subject image sample as including an S-Z feature reversal if the signs of the average correlation coefficients of the fourth and fifth image samples are the same as the sign of the average correlation coefficient of the subject image sample.

20. The method of claim 19, wherein the processing further comprises determining the direction of the identified S-Z reversal in the subject image sample.

21. The method of claim 15, wherein the processing further comprises:
  fitting a first fit function for S-Z stranding to positions on the strand corresponding to a subject image sample with an identified reversal and to a predetermined number of image samples with identified reversals which consecutively precede the subject image sample;
  computing the variation between the position of the subject image sample and a corresponding position defined from the first fit function; and
  identifying the subject image sample as a validated image sample if the variation does not exceed an individual variation limit.

22. The method of claim 21, wherein the first fit function is a sinusoidal function and wherein the fitting is performed using a least squares fit.

23. The method of claim 15, wherein the processing further comprises:
  identifying a predetermined number of consecutive image samples having a reversal feature;
  computing, for a subset of the predetermined number of identified reversals, wherein the subset comprises a plurality of consecutive identified reversals including a subject identified reversal, a first moving average of strand lengths between consecutive pairs of identified reversals for all of the identified reversals in the subset, a second moving average of strand lengths between positive identified reversals and respectively preceding negative identified reversals in the subset and a third moving average of strand lengths between negative identified reversals and respective preceding positive identified reversals in the subset, wherein the negative and positive identified reversals constitute positions on the strand where S-Z stranding direction switches from counterclockwise to clockwise and from clockwise to counterclockwise, respectively;
  computing a positive variation as equal to the second moving average subtracted from the first moving average;
  computing a negative variation as equal to the third moving average subtracted from the first moving average;
  fitting a first fit function for S-Z stranding to positions on the strand corresponding to the subject identified reversal and to a predetermined number of identified reversals in the subset having the same S-Z stranding direction switch as the subject identified reversal,
  wherein the first fit function is adjusted by the negative variation if the direction switch of the subject identified reversal is negative and by the positive variation if the direction switch of the subject identified reversal is positive;
  computing the variation between the position of the subject identified reversal and a corresponding position defined from the first fit function; and
  identifying the subject identified reversal as a validated image sample if the variation does not exceed an individual variation limit.

24. The method of claim 21, wherein the computing the variation step further comprises computing the variation between the positions of other image samples having identified reversals which succeed the subject image sample and corresponding positions defined from the first fit function, and the method further comprising identifying the other succeeding image samples as validated image samples if the variations respectively do not exceed an individual variation limit.

25. The method of claim 23, wherein the computing the variation step further comprises computing the variation between the positions of other image samples having identified reversals which succeed and have the same S-Z direction switch as the subject identified reversal and corresponding positions defined from the direction switch adjusted first fit function, and the method further comprising identifying the other succeeding image samples as validated image samples if the variations respectively do not exceed an individual variation limit.

26. The method of claim 21, wherein, if the variation for the subject image sample exceeds the individual variation limit, the processing further comprises:
  computing the variation between each of the positions of a predetermined number of image samples with identified reversals which consecutively succeed the subject image sample and corresponding positions defined from the first fit function; and
  computing a reversal position for the subject image sample representative of a position on the strand if the variation for each of the consecutively succeeding image samples does not exceed a group variation limit.

27. The method of claim 25, wherein, if the variation for the subject identified reversal exceeds the individual variation limit, the processing further comprises:
  computing the variation between each of the positions of a predetermined number of image samples with identified reversals which consecutively succeed and have the same direction switch as the subject identified reversal and corresponding positions defined from the direction switch adjusted first fit function; and
  computing a reversal position for the subject image sample representative of a position on the strand if the variation for each of the consecutively succeeding image samples does not exceed a group variation limit.

28. The method of claim 26, wherein, if the variation for each of the consecutively succeeding image samples exceeds the group variation limit value, the processing further comprises:
  fitting a second fit function for S-Z stranding to the consecutively succeeding image samples, wherein the second fit function is the same as the first fit function except for a predetermined phase difference;
  computing the variation between each of the positions of the consecutively succeeding image samples and corresponding positions defined from the second fit function; and computing the variation between the position of a succeeding subject image sample and a corresponding position defined from the second fit function if the variation for each of the consecutively succeeding image samples does not exceed the group variation limit.

29. The method of claim 27, wherein, if the variation for each of the consecutively succeeding image samples exceeds the group variation limit value, the processing further comprises:

fitting a second fit function for S-Z stranding to the consecutively succeeding image samples, wherein the second fit function is the same as the first fit function except for a predetermined phase difference;

computing the variation between each of the positions of the consecutively succeeding image samples and corresponding positions defined from the second fit function; and computing the variation between the position of a succeeding subject image sample and a corresponding position defined from the second fit function if the variation for each of the consecutively succeeding image samples does not exceed the group variation limit.

30. The method of claim 15 further comprising:

generating a marking signal based on the advance of the cable on the path from the first position to the second position and the position on the strand corresponding to an image sample identified as having the S-Z feature;

transmitting the marking signal to a marker positioned along the path spaced from the selected position in the direction of the advance of the cable; and marking indicia on a desired position on the cable by the marker, based on receipt of the marking signal.

31. The method of claim 30 further comprising:

advancing the marking of the indicia based on receipt of the marking signal at the marker to compensate for a delay between the receipt of the marking signal and marking of the indicia by the marker.

32. The method of claim 30, wherein the indicia is a luminescent marking.

33. A system for marking a generally longitudinal member which is advanced longitudinally based on optical detection of a feature on the advancing member comprising:

an optical detector for obtaining optical image samples of the member by detecting optical reflected light from the advancing member and for generating digital intensity data representative of the image samples;

a marker;

a driver for advancing the member over a path extending from the detector to the marker;

a position means coupled to the path for detecting the advance of the member along the path and generating a position data signal representative of the advance of the member along the path; and a microcontroller coupled to the detector, the advance position means and the marker, wherein the microcontroller processes the intensity and the position data signals for identifying a position on the member having the feature and transmits, based on the position on the member having the identified feature, a marking signal to the marker to cause the marker to apply indicia at a desired position on the member.

34. The system of claim 33, wherein the optical detector includes a camera.

35. The system of claim 33, wherein the optical detector includes a luminescent sensor.

36. The system of claim 34, wherein the member comprises a plurality of S-Z stranded buffer tubes, wherein each of tubes contains at least one optical fiber and wherein the characteristic feature is an S-Z reversal of the buffer tubes.

37. A system for identifying a position of an S-Z reversal on an optical fiber cable including a strand of S-Z stranded optical fiber media which is longitudinally advanced by optical image detection and processing and for marking the advancing cable based on the identification of the position of the S-Z reversal, the system comprising:

a camera for obtaining optical image samples of the strand;

a jacketing means for applying jacketing to the strand;

a driver for advancing the cable along a path extending from the camera, to the jacketing means and then to the marker and for generating encoder pulses representative of the advance of the cable from the camera to the marker;

a marker for applying indicia to the cable; and a microcontroller coupled to the camera, the driver and the marker, wherein the microcontroller converts the optical image samples into representative digital intensity data, correlates the intensity data of the images sampled with the encoder pulses to identify the position on the strand at which an optical image was sampled, processes the digital intensity data for identifying an image sample which includes an S-Z reversal and transmits a marking signal to the marker to cause the marker to apply indicia on the jacketing on the strand at a position corresponding to a position on the strand identified as having an S-Z reversal.

38. The system of claim 37, wherein the camera includes a color camera arranged along the path for simultaneously obtaining optical image samples from diametrically opposing sides of the strand, and wherein the microcontroller identifies an image sample as including an S-Z reversal based on whether the intensity data is representative of a predetermined color level.

39. The system of claim 37, wherein the microcontroller identifies an optical image sample as including an S-Z reversal based on the contrast level for the intensity data for an image sample.

* * * * *